US012681694B2

(12) United States Patent
Zhang et al.

(10) Patent No.: US 12,681,694 B2
(45) Date of Patent: Jul. 14, 2026

(54) MULTIPLIER, METHOD, INTEGRATED CIRCUIT CHIP, AND COMPUTING DEVICE FOR FLOATING POINT OPERATION

(71) Applicant: Anhui Cambricon Information Technology Co., Ltd., Hefei (CN)

(72) Inventors: Yao Zhang, Hefei (CN); Shaoli Liu, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 1127 days.

(21) Appl. No.: 17/620,583

(22) PCT Filed: Oct. 13, 2020

(86) PCT No.: PCT/CN2020/120716
§ 371 (c)(1),
(2) Date: Sep. 30, 2022

(87) PCT Pub. No.: WO2021/073511
PCT Pub. Date: Apr. 22, 2021

(65) Prior Publication Data
US 2024/0289092 A1      Aug. 29, 2024

(30) Foreign Application Priority Data

Oct. 14, 2019      (CN) .......................... 201910970802.8
Oct. 9, 2020      (CN) .......................... 202011074061.4

(51) Int. Cl.
*G06F 7/523*                (2006.01)
(52) U.S. Cl.
CPC .................................... *G06F 7/523* (2013.01)
(58) Field of Classification Search
CPC .................................................... G06F 7/523
See application file for complete search history.

(56) References Cited

U.S. PATENT DOCUMENTS 4,754,421 A      6/1988  Bosshart
6,115,729 A  *   9/2000  Matheny ............... G06F 7/5443
                                                    708/501

(Continued)

FOREIGN PATENT DOCUMENTS

CN          102722352 A      10/2012
CN          102722352 B       6/2015

(Continued)

OTHER PUBLICATIONS

CN202011074061.4—Second Office Action mailed on Mar. 15, 2025, 12 pages.

(Continued)

*Primary Examiner* — Michael D. Yaary
(74) *Attorney, Agent, or Firm* — Getech Law LLC; Jun Ye

(57) ABSTRACT

The present disclosure relates to a multiplier, a method, an integrated circuit chip, and a computation apparatus for a floating-point computation. The computation apparatus is included in a combined processing apparatus. The combined processing apparatus further includes a universal interconnection interface and other processing apparatus. The computation apparatus interacts with other processing apparatus to jointly complete computing operations specified by the user. The combined processing apparatus also includes a storage apparatus. The storage apparatus is respectively connected to the computation apparatus and other processing apparatus and is used for storing data of the computation apparatus and other processing apparatus. Solutions of the present disclosure is widely used in various floating-point data computations.

18 Claims, 7 Drawing Sheets

(56) References Cited

U.S. PATENT DOCUMENTS

| | | | | |
|---|---|---|---|---|
| 7,840,628 | B2 | 11/2010 | Kurd | |
| 8,019,805 | B1 | 9/2011 | Sarma | |
| 8,301,681 | B1 | 10/2012 | Lee et al. | |
| 9,317,251 | B2 | 4/2016 | Tsen et al. | |
| 9,823,897 | B2 | 11/2017 | Lutz | |
| 10,152,303 | B2 | 12/2018 | Bruguera | |
| 2007/0061391 | A1* | 3/2007 | Tan | G06F 7/49936 |
| | | | | 708/495 |
| 2010/0057824 | A1 | 3/2010 | Rarick | |
| 2013/0159367 | A1 | 6/2013 | Dubrovin et al. | |
| 2013/0282783 | A1* | 10/2013 | Li | G06F 7/5443 |
| | | | | 708/501 |
| 2015/0254066 | A1 | 9/2015 | Lutz et al. | |
| 2019/0042193 | A1 | 2/2019 | Pasca et al. | |
| 2019/0042244 | A1 | 2/2019 | Henry et al. | |
| 2019/0155574 | A1 | 5/2019 | Langhammer et al. | |
| 2019/0196785 | A1 | 6/2019 | Danysh et al. | |
| 2021/0011686 | A1 | 1/2021 | Makino et al. | |

FOREIGN PATENT DOCUMENTS

| | | | |
|---|---|---|---|
| CN | 103809930 | B | 5/2017 |
| CN | 104321741 | B | 3/2018 |
| CN | 108459840 | A | 8/2018 |
| CN | 109643227 | A | 4/2019 |
| CN | 109634558 | B | 1/2020 |
| CN | 108459840 | B | 7/2021 |
| CN | 108958705 | B | 11/2021 |
| JP | 6371451 | B2 | 8/2018 |
| TW | 102141083 | A | 4/2016 |

OTHER PUBLICATIONS

PCT/CN2020/120716—International Search Report, mailed Jan. 12, 2021, 7 pages. (with English translation).

PCT/CN2020/120717—International Search Report, mailed Jan. 13, 2021, 7 pages. (with English translation).

TW 109135585—First Office Action, mailed Nov. 3, 2021, 8 pages. (with brief English explanation).

CN202011074061.4—First Office Action mailed on Nov. 8, 2024, 18 pages.

CN202011075144.5—First Office Action malled on Nov. 30, 2024, 14 pages.

U.S. Appl. No. 17/620,601—Non-Final Office Action mailed on Feb. 27, 2026, 34 pages.

* cited by examiner

500

600

900

1000

MULTIPLIER, METHOD, INTEGRATED CIRCUIT CHIP, AND COMPUTING DEVICE FOR FLOATING POINT OPERATION

CROSS REFERENCE OF RELATED APPLICATION

This is a 371 of International Application No. PCT/CN2020/120716, filed Oct. 13, 2020 which claims priority to Chinese Patent Application No. 201910970802.8 with the title of "MULTIPLIER, METHOD, INTEGRATED CIRCUIT CHIP, AND COMPUTING DEVICE FOR FLOATING-POINT OPERATION" filed on Oct. 14, 2019, and the present application claims priority to Chinese Patent Application No. 202011074061.4 with the title of "MULTIPLIER, METHOD, INTEGRATED CIRCUIT CHIP, AND COMPUTING DEVICE FOR FLOATTING-POINT OPERATION" filed on Oct. 9, 2020. The contents of the aforementioned applications are herein incorporated by reference in their entireties.

TECHNICAL FIELD

The present disclosure generally relates to a floating-point computation field. More specifically, the present disclosure relates to a method, a multiplier, an integrated circuit chip, and a computation apparatus for a floating-point computation.

BACKGROUND

Among various kinds of sign processing algorithms at present, such as an inner product operation between vectors and a convolutional computation of a matrix, lots of multiplication and addition operations are involved, and efficiency of these multiplication and addition operations often depends on an execution speed of a multiplier. Even though execution efficiency of a multiplier has been remarkably improved at present, there is still room for improvement in processing floating-point-type data. Therefore, how to obtain a multiplier with high efficiency, low power consumption and a low cost to perform a multiplication of the floating-point data is a problem to be solved in the prior art.

SUMMARY

To at least partly solve a technical problem mentioned in the background, solutions of the present disclosure provide a multiplier, a method, an integrated circuit chip including the multiplier and a computation apparatus for a floating-point computation.

A first aspect of the present disclosure provides a multiplier configured to perform a floating-point number multiplication computation, where the multiplier includes: a mantissa processing unit configured to obtain a mantissa after the multiplication computation according to a mantissa of the floating-point number, and the mantissa processing unit includes a control circuit, which is configured to call the mantissa processing unit multiple times when a mantissa bit width of at least one of two floating-point numbers is larger than a data bit width that is processable at one time by the mantissa processing unit.

A second aspect of the present disclosure provides a method for performing a floating-point number multiplication computation by using a multiplier, where by using a mantissa processing unit of the multiplier, a mantissa after the multiplication computation may be obtained according to a mantissa of the floating-point number, and the mantissa processing unit includes a control circuit configured to call the mantissa processing unit multiple times when a mantissa bit width of at least one of two floating-point numbers is larger than a data bit width that is processable at one time by the mantissa processing unit.

A third aspect of the present disclosure provides an integrated circuit chip that includes the multiplier. In one or more embodiments, the multiplier of the present disclosure may form an independent integrated circuit chip or be arranged in an integrated circuit chip or a computation apparatus to perform a computation of a floating-point number with various types of data formats.

By using the multiplier, a corresponding computation method, the integrated circuit chip and the computation apparatus, a computation of data with various floating-point types may be supported, and it is not required to provide a plurality of separate multipliers for data with different floating-point types. Therefore, the multiplier of the present disclosure is applicable, and may be widely used in various floating-point data computations. In addition, when processing input data with a large bit width, the multiplier of the present disclosure supports a cyclical reusing operation, and it is not required to arrange more processing chips, thereby reducing an arrangement area of an integrated circuit.

BRIEF DESCRIPTION OF THE DRAWINGS

By reading the following detailed description with reference to the drawings, the above-mentioned and other objects, features and technical effects of the exemplary embodiments of the present disclosure may be easier to understand. In the drawings, several embodiments of the present disclosure are shown in an exemplary but not a restrictive manner, and the same or corresponding reference numerals indicate the same or corresponding parts of the embodiments.

DETAILED DESCRIPTION OF THE EMBODIMENTS

Technical solutions of the present disclosure provide a multiplier, a method, an integrated circuit chip, and a computation apparatus for a floating-point number computation. Different from a multiplier for a floating-point computation in the prior art, the present disclosure provides a multiplier that supports a plurality of types of computation modes, thereby overcoming a defect that an existing multiplier only supports one type of floating-point computation. Specifically, the present disclosure uses the plurality of types of computation modes to indicate different types of floating-point data. In the multiplication computation process of the floating-point number, all types of operations of data may be performed based on one of the computation modes including operations such as encoding, compression, summation, normalization and rounding, thereby implementing an operation associated with one of the plurality of types of floating-point data. Therefore, the multiplier of the present disclosure may support operations in multiple modes, thereby improving flexibility of the floating-point computation and reducing costs of the floating-point computation.

The technical solutions and a plurality of embodiments of the present disclosure may be described in detail below with reference to drawings. It should be understood that many specific details of the floating-point computation will be described to provide a thorough understanding of the plurality of embodiments of the present disclosure. However, under the teaching of the present disclosure, those of ordinary skill in the art may practice the plurality of embodiments of the present disclosure without these specific details. In other cases, the content of the present disclosure does not describe well-known methods, processes, and components in detail, so as to avoid unnecessary obscuration of the embodiments of the present disclosure. In addition, the description should not be regarded as a limitation on the scope of the plurality of embodiments of the present disclosure.

Figure 1:
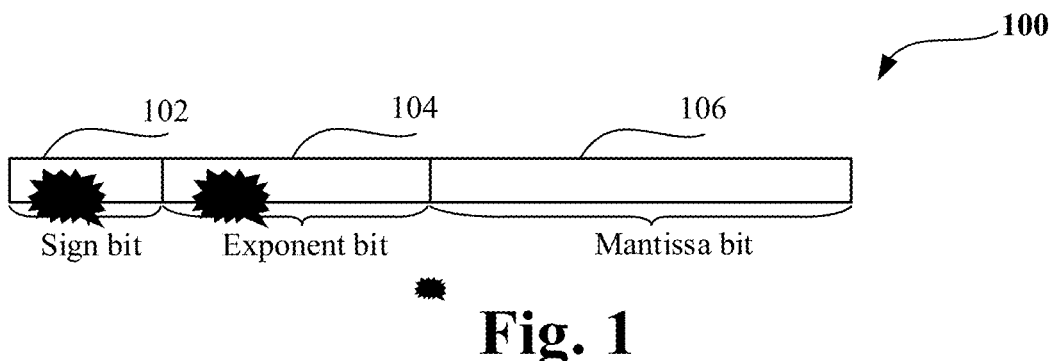
FIG. 1 is a schematic diagram of a floating-point data format, according to an embodiment of the present disclosure.

FIG. 1 is a schematic diagram of a floating-point data format 100, according to an embodiment of the present disclosure. As shown in FIG. 1, a floating-point number that may be applied to the technical solutions of the present disclosure may include three parts, such as a sign (or a sign bit) 102, an exponent (or an exponent bit) 104 and mantissa (or a mantissa bit) 106, where for an unsigned floating-point number, there may be no sign or sign bit. In some embodiments, the floating-point number that may be applied to the multiplier of the present disclosure may include at least one of numbers including a half-precision floating-point number, a single precision floating-point number, a brain floating-point number, a double precision floating-point number and a self definition floating-point number. Specifically, in some embodiments, a floating-point data format that may be applied to the technical solutions of the present disclosure may be a floating-point format that complies with an IEEE754 standard, such as a double precision floating-point number (float64, abbreviated as "FP64"), a single precision floating-point number (float32, abbreviated as "FP32"), or a half-precision floating-point number (float16, abbreviated as "FP16"). In some other embodiments, the floating-point data format may be an existing 16-bit brain floating-point number (bfloat16, abbreviated as "BF16"), or may be a self definition floating-point data format such as an 8-bit brain floating-point number (bfloat8, abbreviated as "BF8"), an unsigned half-precision floating-point number (float16, abbreviated as "UFP16"), and an unsigned 16-bit brain floating-point number (bfloat16, abbreviated as "UBF16"). In order to facilitate understanding, a following Table 1 shows part of the above-mentioned data formats, where a sign bit width, an exponent bit width and a mantissa bit width are only used for an exemplary description.

TABLE 1

| Data type | Sign bit width | Exponent bit width | Mantissa bit width |
|---|---|---|---|
| FP16 | 1 | 5 | 10 |
| BF16 | 1 | 8 | 7 |
| FP32 | 1 | 8 | 23 |
| BF8 | 1 | 5 | 3 |
| UFP16 | 0 | 5(or 6) | 11(or 10) |
| UBF16 | 0 | 8 | 8 |

For all types of the above-mentioned floating-point data formats, the multiplier of the present disclosure may at least support a multiplication operation of two floating-point numbers with any data format described above, where the two floating-point numbers may have a same floating-point data format or different floating-point data formats. For example, the multiplication operation of two floating-point numbers may be an FP16*FP16, a BF16*BF16, an FP32*FP32, an FP32*BF16, an FP16*BF16, an FP32*FP16, a BF8*BF16, an UBF16*UFP16 or an UBF16*FP16.

Figure 2:
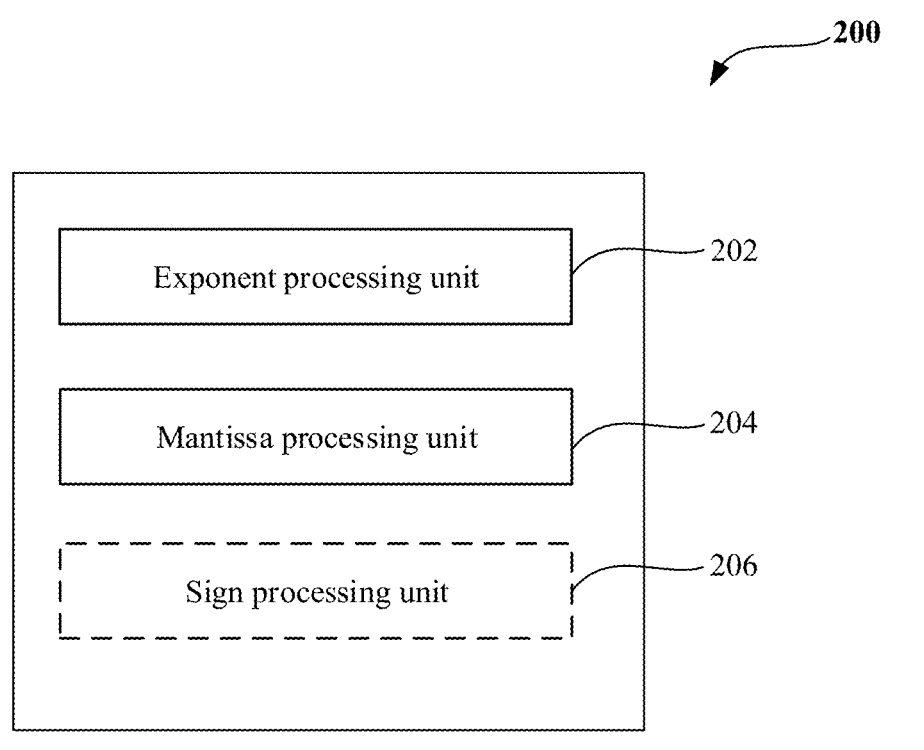
FIG. 2 is an schematic structural block diagram of a multiplier, according to an embodiment of the present disclosure.

FIG. 2 shows a schematic structural block diagram of a multiplier 200, according to an embodiment of the present disclosure. As mentioned above, the multiplier of the present disclosure supports a multiplication operation of floating-point numbers with various types of data formats. These types of data formats may be indicated by using computation modes of the present disclosure, so as to make the multiplier work in one of the plurality of types of computation modes.

As shown in FIG. 2, the multiplier of the present disclosure may generally include an exponent processing unit 202 and a mantissa processing unit 204, where the exponent processing unit may be configured to process an exponent bit of a floating-point number, and the mantissa processing unit may be configured to process a mantissa bit of the floating-point number. Optionally or additionally, in some embodiments, if the floating-point number processed by the multiplier has a sign bit, the multiplier may further include a sign processing unit 206 configured to process a floating-point number with the sign bit.

In operations, the multiplier may perform the floating-point computation on a first floating-point number and a second floating-point number that are received, input or cached according to one of the computation modes, where the first floating-point number and the second floating-point number have one of the above-mentioned floating-point data formats. For example, when the multiplier is in a first computation mode, it may support the multiplication computation of two floating-point numbers FP16*FP16, and when the multiplier is in a second computation mode, it may support the multiplication computation of two floating-point numbers BF16*BF16. Similarly, when the multiplier is in a third computation mode, it may support the multiplication computation of two floating-point numbers FP32*FP32, and when the multiplier is in a forth computation mode, it may support the multiplication computation of two floating-point numbers FP32*BF16. The correspondence of exemplary computation modes and floating-point numbers are shown in Table 2 below.

TABLE 2

| Computation mode number | Computation floating-point number type |
|---|---|
| 1 | FP16*FP16 |
| 2 | BF16*BF16 |
| 3 | FP32*FP32 |
| 4 | FP32*BF16 |

In an embodiment, the above-mentioned Table 2 may be stored in one memory of the multiplier, and the multiplier selects one of the computation modes in the Table 2 according to an instruction received from an external device. For example, the external device may be an external device 1012 shown in FIG. 10. In another embodiment, an input of the computation mode may be automatically implemented through a mode selection unit 308 shown in FIG. 3. For example, when two FP16-type floating-point numbers are input into the multiplier of the present disclosure, the mode selection unit may select the first computation mode as the operation mode of the multiplier according to the data formats of the two floating-point numbers. For another example, when an FP32-type floating-point number and a BF16-type floating-point number are input into the multiplier of the present disclosure, the mode selection unit may select the forth computation mode as the operation mode of the multiplier according to the data formats of the two floating-point numbers.

It may be seen that different computation modes of the present disclosure are associated with corresponding floating-point data. In other words, the computation mode of the present disclosure may be configured to indicate the data format of the first floating-point number and the data format of the second floating-point number. In another embodiment, the computation mode of the present disclosure may not only be configured to indicate the data format of the first floating-point number and the data format of the second floating-point number, but may also be configured to indicate a data format after the multiplication computation. With reference to Table 2, those extended computation modes are shown in the following Table 3.

TABLE 3

| Computation mode number | Computation floating-point number type | Output result type |
|---|---|---|
| 11 | FP16*FP16 | FP16 |
| 12 | | BF16 |
| 13 | | FP32 |
| 21 | BF16*BF16 | FP16 |
| 22 | | BF16 |
| 23 | | FP32 |
| 31 | FP32*FP32 | FP16 |
| 32 | | BF16 |
| 33 | | FP32 |
| 41 | FP32*BF16 | FP16 |
| 42 | | BF16 |
| 43 | | FP32 |

Different from numbers of computation modes shown in Table 2, computation modes in Table 3 are extended one bit for indicating the data format after multiplication computation of floating-point numbers. For example, when the multiplier is operated in the computation mode 21, the multiplier performs a floating-point computation to the input two floating-point numbers BF16*BF16 and outputs a data format in a type of FP16 after the floating-point multiplication computation.

Using the computation mode in the form of number to indicate the floating-point data format is only exemplary but not restrictive. According to the teaching of the present disclosure, it is also conceivable to establish an index according to the computation mode to determine a format of a multiplier and a format of a multiplicand. For example, the computation mode includes two indexes. A first index is configured to indicate a type of the first floating-point number, and a second index is configured to indicate a type of the second floating-point number. For example, a first index "1" in a computation mode 13 indicates the first floating-point number (or called as the multiplicand) as a first floating-point format, and a second index "3" in the computation mode 13 indicates the second floating-point number (or called as the multiplier) as a second floating-point format, which is the FP32. Further, a third index may be added to the computation mode, and the third index indicates a data format of an output result. For example, a third index "1" in a computation mode 131 may indicate that the data format of the output result is the first floating-point format, which is the FP16. When a count of computation modes increases, a corresponding index or index layer may be added according to a need to establish a relation between the computation mode and the data format.

In addition, although a numerical number is used here to indicate the computation mode exemplarily, in other examples, the computation mode may also be indicated by other signs or numbers according to application requirements. For example, expressions such as letters, signs, numbers or combinations thereof may be used to indicate the computation mode, which may identify the data format of the first floating-point number, the data format of the second floating-point number and the data format of the output result. In addition, when these expressions are formed in the form of an instruction, the instruction may include three domains or fields. A first domain is configured to indicate the data format of the first floating-point number, a second domain is configured to indicate the data format of the second floating-point number, and a third domain is configured to indicate the data format of the output result. Certainly, these domains may be merged into one domain, or a new domain may be added to indicate more contents about the floating-point data format. It may be seen that computation modes of the present disclosure may not only associate with the input floating-point number data format, but may also be applied to normalize the output result to obtain a multiplication result with an expected data format.

Figure 3:
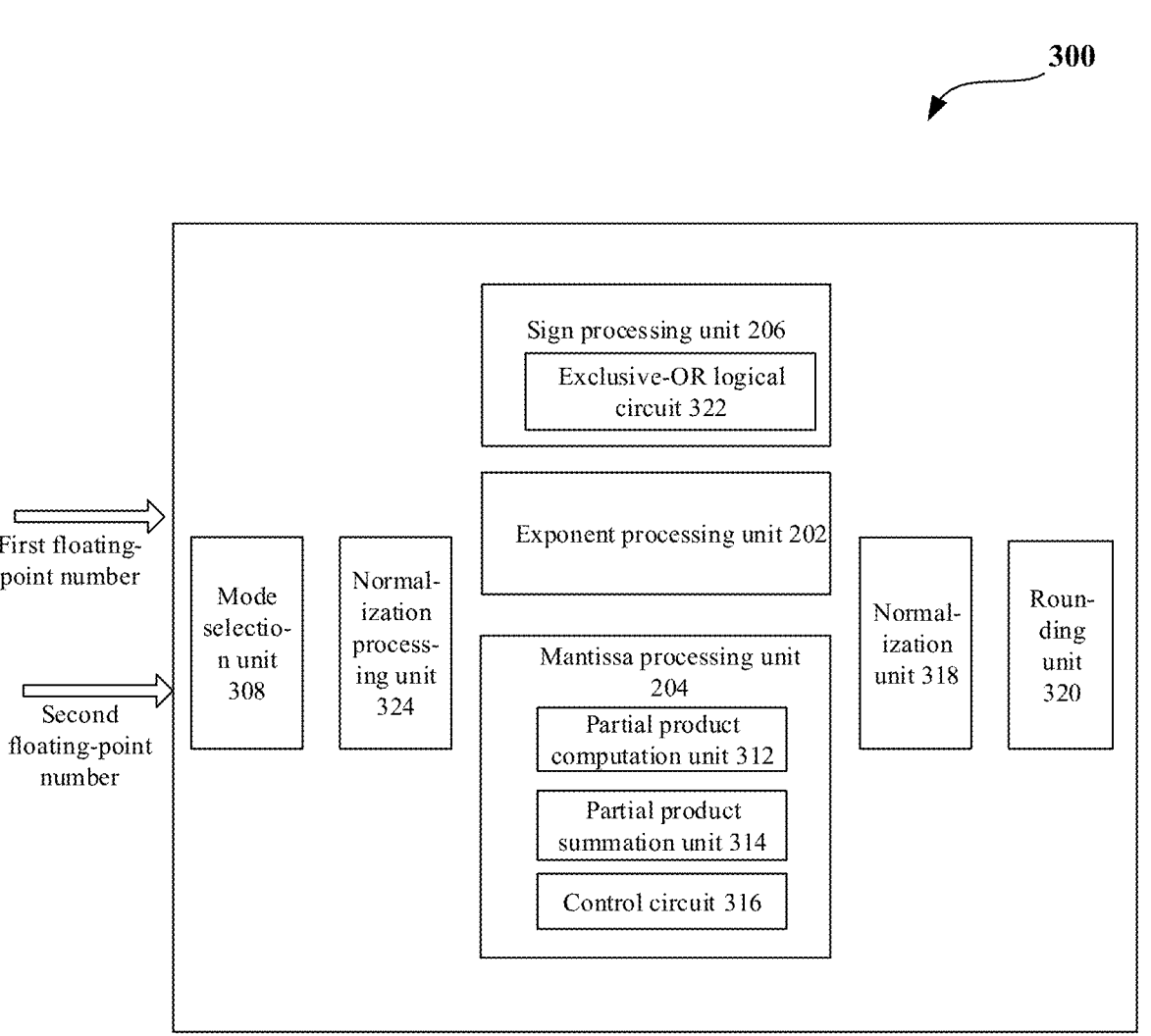
FIG. 3 is a structural block diagram of more details of the multiplier, according to an embodiment of the present disclosure.

FIG. 3 is a structural block diagram of more details of a multiplier 300 according to an embodiment of the present disclosure. It may be seen from FIG. 3 that the multiplier 300 not only includes the exponent processing unit 202, the mantissa processing unit 204 and the optional sign processing unit 206 in FIG. 2, but also shows internal components of these units and units associated with operations of these units. Exemplary operations of these units are described in detail below with reference to FIG. 3.

In order to perform the multiplication computation of floating-point numbers, the exponent processing unit may be configured to obtain the exponent after the multiplication computation according to the above mentioned computation mode, the exponents of the first floating-point number and the exponents of the second floating-point number. In an embodiment, the exponent processing unit may be implemented through an adder and subtracter circuit. For example, the exponent processing unit here may be configured to obtain exponents of the first floating-point number and the second floating-point number after the multiplication computation by first respectively adding the exponent of the first floating-point number and the exponent of the second floating-point number to offsets of their corresponding input floating-point data formats, and second respectively subtracting offsets of their corresponding output floating-point data format.

Further, the mantissa processing unit of the multiplier may be configured to obtain the mantissa after the multiplication computation according to the above mentioned computation mode, the first floating-point number and the second floating-point number. In an embodiment, the mantissa processing unit may include a partial product computation unit 312 and a partial product summation unit 314, where the partial product computation unit is configured to obtain an intermediate result according to the mantissa of the first floating-point number and the mantissa of the second floating-point number. In some embodiments, the intermediate result may be a plurality of partial products (as shown illustratively in FIG. 5 and FIG. 6) obtained during the multiplication of the first floating-point number and the second floating-point number. The partial product summation unit is configured to sum intermediate results to obtain a summation result, and take the summation result as the mantissa after the multiplication computation.

In order to obtain the intermediate result, in an embodiment, the present disclosure uses a Booth encoding circuit to add zeros to a high bit and a low bit (where adding zeros to the high bit is transforming the mantissa from an unsigned number to a signed number) of the mantissa of the second floating-point number (for example, the second floating-point number is the multiplier in the floating-point computation) to obtain the intermediate result. It needs to be understood that the mantissa of the first floating-point number (for example, the first floating-point number is the multiplicand in the floating-point computation) may be encoded (such as adding zeros to the high bit and the low bit) according to different methods of encoding, or both the mantissa of the first floating-point number and the mantissa of the second floating-point number may be encoded to obtain the plurality of partial products. The partial product may be described in detail below by referring to the drawings.

In another embodiment, the partial product summation unit may include an adder, and the partial product summation unit is configured to sum the intermediate results to obtain the summation result. In another embodiment, the partial product summation unit may include a Wallace tree and an adder, where the Wallace tree is configured to sum the intermediate results to obtain a second intermediate result, and the adder is configured to sum second intermediate results to obtain the summation result. In these embodiments, the adder may include at least one of adders including a full adder, a serial adder and a carry-lookahead adder.

In an embodiment, the multiplier of the present disclosure may include a normalization unit 318 and a rounding unit 320. The normalization unit may be configured to perform floating-point number normalization processing to the mantissa and the exponent after the multiplication computation to obtain a normalized exponent result and a normalized mantissa result, and take normalized exponent result as the exponent after the multiplication computation and take the normalized mantissa result as the mantissa after the multiplication computation. For example, the normalization unit may adjust data bit widths of the exponent and the mantissa according to the data format indicated by the computation mode to make the data bit widths of the exponent and the mantissa meet the requirement of the above mentioned indicated computation mode. In addition, the normalization unit may also adjust other aspects of the exponent or the mantissa. For example, in some application scenarios, when the value of the mantissa is not 0, the highest significant bit of the mantissa bit should be 1; otherwise, the normalization unit may modify the exponent bit and shift the mantissa bit at the same time to make the mantissa bit be the form of a normalized number. In another embodiment, the normalization unit may adjust the exponent after the multiplication computation according to the mantissa after the multiplication computation. For example, when the highest bit of the mantissa after the multiplication computation is 1, the normalization unit may add 1 to the exponent obtained after the multiplication computation. Correspondingly, the rounding unit may perform a rounding operation to the normalized mantissa result according to a rounding mode, and set the mantissa after the rounding operation as the mantissa after the multiplication computation. According to different scenarios, the rounding unit may perform rounding operations such as rounding down, rounding up and rounding to the nearest significant number. In some application scenarios, the rounding unit may also round the one moved out in the process of shifting the mantissa to the right.

Except for the exponent processing unit and the mantissa processing unit, the multiplier of the present disclosure may optionally include a sign processing unit. When the input floating-point number is a floating-point number with a sign bit, the sign processing unit may be configured to obtain a sign after the multiplication computation according to a sign of the first floating-point number and a sign of the second floating-point number. For example, in an embodiment, the sign processing unit may include an exclusive-OR logical circuit 322, which is configured to perform an exclusive computation according to the sign of the first floating-point number and the sign of the second floating-point number to obtain the sign after the multiplication computation. In another embodiment, the sign processing unit may be implemented through a truth table or a logical judgment.

In addition, in order to make the input or received first floating-point number and second floating-point number conform to a defined format, in an embodiment, the multiplier of the present disclosure may further include a normalization processing unit 324. When the first floating-point number or the second floating-point number is a non-normalized and non-zero floating-point number, the normalization processing unit 324 is configured to perform normalization processing on the first floating-point number or the second floating-point number according to the computation mode to obtain a corresponding exponent and a corresponding mantissa. For example, when a selected computation mode is a second computation mode shown in Table 2, and the input first floating-point number and the input second floating-point number are the FP16 type data, the normalization processing unit may be configured to normalize the FP16 type data to the BF16 type data to make the multiplier be operated in the second computation mode. In one or more embodiments, the normalization processing unit may be configured to pre-process (such as extending the mantissa) a mantissa of the normalized floating-point number with an implicit 1 and a mantissa of the non-normalized floating-point number without an implicit 1 for the convenience of a subsequent operation of the mantissa processing unit. Based on the above description, it may be understandable that the normalization processing unit 324 here and the above-mentioned normalization unit 318 may perform a same or similar operation in some embodiments. What is different is that the normalization unit 324 is configured to normalize the input floating-point number, but the normalization unit 318 is configured to normalize the about to output mantissa and exponent.

The multiplier of the present disclosure and various embodiments thereof have been described above with reference to FIG. 3. Based on the above description, those skilled in the art may understand that in the solutions of the present disclosure, the result (exponents, mantissas and optional signs) after the multiplication computation is obtained through an execution of the multiplier. According to different application scenarios, for example, when the above-mentioned normalization processing and the rounding processing are not required, a result obtained through the mantissa processing unit and the exponent processing unit may be seen as a final computation result. Further, when the above-mentioned normalization processing and rounding processing are required, the exponent and mantissa obtained through the normalization processing and rounding processing may be seen as the final computation results or part of the final computation result (when considering a final sign). Further, the solutions of the present disclosure use the plurality of computation modes to make the multiplier support the computation of different floating-point numbers with different types or data formats, thereby implementing reusing of the multiplier, and then saving an overhead of a chip design and a computation cost. In addition, through a plurality-of-calling mechanism, the multiplier of the present disclosure may support a computation of a floating-point number with a high bandwidth. Given that a multiplication operation of the mantissa (or called as the mantissa bit or a mantissa part) is very important to a performance of a whole floating-point number computation. The mantissa operation of the present disclosure may be described by referring to FIG. 4.

Figure 4:
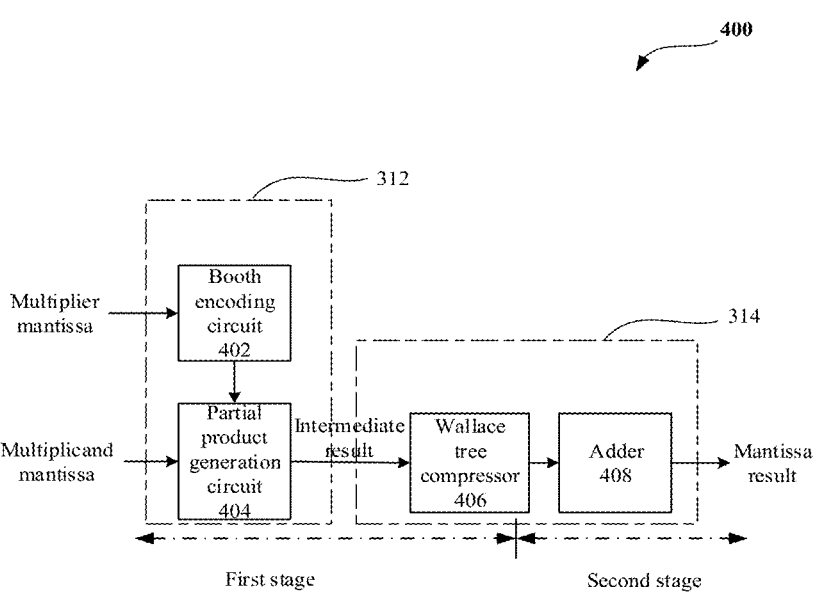
FIG. 4 is a schematic block diagram of a mantissa processing unit, according to an embodiment of the present disclosure.

FIG. 4 is a schematic block diagram of a mantissa processing unit operation 400, according to an embodiment of the present disclosure. As shown in FIG. 4, a mantissa processing operation may mainly involve two units, which are the above-mentioned partial product computation unit and the partial product summation unit discussed by referring to FIG. 3. From the perspective of operation timing, the mantissa processing operation may be divided into a first stage and a second stage. In the first stage, the intermediate result may be obtained in the mantissa processing operation, and in the second stage, a mantissa result output from an adder 408 may be obtained in the mantissa processing operation.

In an exemplary specific operation, the first floating-point number and the second floating-point number that are received by the multiplier may be divided into a plurality of parts, which are the above-mentioned sign (which is optional), the above-mentioned exponent and the above-mentioned mantissa. Optionally, after the normalization processing, mantissa parts of the two floating-point numbers may enter the mantissa processing unit (the mantissa processing unit shown in FIG. 2 or FIG. 3) as inputs, and specifically enter the partial product computation unit. As shown in FIG. 4, the present disclosure uses a Booth encoding circuit 402 to add zeros to the high bit and the low bit of the mantissa of the second floating-point number (which is the multiplier in the floating-point computation), and to perform Booth encoding processing to the second floating-point number, thereby obtaining the intermediate result in a partial product generation circuit 404. Certainly, the first floating-point number and the second floating-point number here are only used for illustrative but not restrictive purposes. Therefore, in some application scenarios, the first floating-point number may be the multiplier and the second floating-point number may be the multiplicand. Correspondingly, in some encoding processing, encoding operation may be performed on the floating-point number that serves as the multiplicand.

In order to better understand the technical solutions of the present disclosure, a Booth encoding may be briefly introduced below. Generally, when two binary numbers are multiplied together, a plurality of intermediate results called partial products may be generated through the multiplication operation, and then the final result of the multiplication of two binary numbers may be obtained by accumulating these partial products, where the greater the number of partial products, the greater the area and power consumption of an array multiplier, the slower the execution speed, and the more difficult it is to perform the circuit. However, a purpose of the Booth encoding is to effectively reduce the number of sum terms of partial products, thereby reducing a circuit area. An algorithm of the Booth encoding is to first encode the input multiplier according to corresponding regulations. In an embodiment, for example, encoding regulations may be regulations shown in Table 4 below.

TABLE 4

| To-be-coded data | | | Encoding signal |
|---|---|---|---|
| $y_{2i+1}$ | $y_{2i}$ | $y_{2i-1}$ | PPi |
| 0 | 0 | 0 | 0 |
| 0 | 0 | 1 | X |
| 0 | 1 | 0 | X |
| 0 | 1 | 1 | 2X |
| 1 | 0 | 0 | $-2X$ |
| 1 | 0 | 1 | $-X$ |
| 1 | 1 | 0 | $-X$ |
| 1 | 1 | 1 | $-0(=0)$ |

In Table 4, $y_{2i+1}$, $y_{i2}$ and $y_{2i-1}$ may represent values corresponding to each group of sub-data to be coded (which is the multiplier), and X may represent the mantissa of the first floating-point number (which is the multiplicand). A corresponding encoding signal PPi (i=0, 1, 2, . . . , n) may be obtained after executing the Booth encoding processing on each group of corresponding data to be coded. As illustratively shown in Table 4, the encoding signal obtained after the Booth encoding may include five categories, including $-2X$, $2X$, $-X$, $X$ and $0$ respectively. Exemplarily, base on the above-mentioned encoding regulations, if the received multiplicand is an 8-bit data "$X_7X_6X_5X_4X_3X_2X_1X_0$", following partial products may be obtained.

1) when a multiplier bit includes three-bit-consecutive data "001" in Table 4, the partial product may be X and represented as "$X_7X_6X_5X_4X_3X_2X_1X_0$", and the ninth bit is the sign bit, which is PPi={X[7], X};

2) when the multiplier bit includes three-bit-consecutive data "011" in Table 4, the partial product may be 2X, representing that X shifted one bit to the left to get "$X_7X_6X_5X_4X_3X_2X_1X_00$", which is PPi={x, 0};

3) when the multiplier bit includes three-bit-consecutive data "101" in Table 4, the partial product may be $-X$ and represented as "$\overline{X_7X_6X_5X_4X_3X_2X_1X_0}+1$", which means, inverting "$X_7X_6X_5X_4X_3X_2X_1X_0$" bit by bit and then plus one, which is PPi=~ {x[7], x}+1;

4) when the multiplier bit includes three-bit-consecutive data "100" in Table 4, the partial product may be $-2X$ and represented as "$\overline{X_7X_6X_5X_4X_3X_2X_1X_0}+1$", which means shifting "$X_7X_6X_5X_4X_3X_2X_1X_0$" one bit to the left, and inverting it and adding one, which is PPi=~ {X, 0}+1;

5) when the multiplier bit includes three-bit-consecutive data "111" or "000" in Table 4, the partial product is 0, which is PPi={9' b0}.

It should be understood that the above description of obtaining the partial product by referring to Table 4 is only exemplary but not restrictive. Under the teaching of the present disclosure, those of ordinary skill in the art may change regulations in Table 4 to obtain a partial product that is different from that shown in Table 4. For example, when there is specific data with a plurality of consecutive bits in the multiplier bit (for example, 3 bits or more), the obtained partial product may be a complement code of the multiplicand, or for example, the "plus 1" operation in the above mentioned 3) and 4) steps may be performed after summing the partial products.

It may be understood according to the above introductory description that encoding the mantissa of the second floating-point number through the Booth encoding circuit and by using the mantissa of the first floating-point number the plurality of partial products may be generated from a partial product generation circuit, and these partial products may be set as the intermediate results and input into a Wallace tree compressor 406 in the partial product summation unit. It should be understood that obtaining the partial product through the Booth encoding is only a preferred method of obtaining the partial product of the present disclosure, and those of ordinary skill in the art may also obtain the partial product through other methods. For example, the partial product may be obtained through a shift operation; in other words, the partial product may be obtained through selecting shift plus the multiplicand or plus 0 to obtain the corresponding partial product according to whether the bit value of the multiplier is 1 or 0. Similarly, using a Wallace tree compressor to implement an addition of the partial products is only exemplary but not restrictive, and those of ordinary skill in the art may also consider using other types of adders to implement addition of the partial products. For example, the adder may be one or a plurality of full adders, half adders or various combinations thereof The Wallace tree compressor (or the Wallace tree) is mainly configured to sum the above-mentioned intermediate results (the plurality of partial products) to reduce a cumulative frequency (which is the compression) of the partial products. Generally, the Wallace tree compressor may adopt a carry-save (CAS) architecture and a Wallace tree algorithm, and through using a Wallace tree array, the computation speed is faster than that of using traditional carry propagate summation.

Specifically, the Wallace tree compressor may perform a parallel computation on partial products of all lines. For example, the cumulative frequency of N partial products may be reduced from $N-1$ to Log $2N$, thereby increasing a speed of the multiplier, which is of great significance to the effective use of resources. According to different application requirements, the Wallace tree compressor may be designed into a plurality of types, such as a 7-2 Wallace tree, a 4-2 Wallace tree and a 3-2 Wallace tree, and the like. In one or more embodiments, the present disclosure uses the 7-2 Wallace tree as an example to implement various floating-point computations, which may be described in detail below by referring to FIG. 5 and FIG. 6.

In some embodiments, the Wallace tree compression operation disclosed in the present disclosure may be set with M inputs and N inputs, and the number of Wallace trees may be no less than K, where N is a preset positive integer less than M, and K is a positive integer no less than the maximum bit width of the intermediate result. For example, M may be 7, and N may be 2, which is the 7-2 Wallace tree that may be described in detail below. When the maximum bit width of the intermediate result is 48, K may be a positive integer 48; in other words, the number of the Wallace tree may be 48.

In some embodiments, according to the computation mode, one or a plurality of groups of Wallace trees may be selected to sum the intermediate results, where each group includes X Wallace trees, and X is a bit number of the intermediate result. Further, a successive carry relationship exists between Wallace trees within one group, but there is no such relationship between each group. In an exemplary connection, the Wallace tree compressors may be connected through a carry. For example, a carry of a Wallace tree in the low bit may be input (such as Cin in FIG. 6) into a Wallace tree compressor in the high bit, and a carry output Cout of the Wallace tree compressor may become the carry input received from a Wallace tree compressor in a higher bit from the Wallace tree compressor in the low bit. In addition, when selecting one or more Wallace tree compressors from a plurality of Wallace tree compressors, the selection may be arbitrary. For example, the Wallace tree compressors may be selected according to numerical order 0, 1, 2 and 3, or may be connected according to numerical order 0, 2, 4 and 6 as long as a selected Wallace tree compressor is selected according to the above-mentioned carry relationship.

The above-mentioned Wallace trees and the operation may be introduced through a combination of an illustrative example in the following. It is supposed that the first floating-point number and the second floating-point number are 16-bit data (for example, FP16*FP16), and the multiplier supports 32-bit data bit width (which means the multiplier may support a parallel multiplication operation of two groups of 16-bit data), and the Wallace tree compressor is a 7-2 Wallace tree compressor with 7 (an exemplary value of the above-mentioned M) inputs and 2 (an exemplary value of the above-mentioned N) outputs, and in such exemplary scenario, 48 (an exemplary value of the above-mentioned K) Wallace trees may be adopted to finish multiplication computations of two groups of data in parallel.

In the above-mentioned 48 Wallace trees, the Wallace trees from 0th to 23rd (24 Wallace trees in the first group of Wallace tree) may finish a partial product summation computation of the first group of multiplication, and each Wallace tree in the group may be connected one by one through the carry. Further, the 24th to 47th Wallace trees (24 Wallace trees in the second group of Wallace trees) may finish a partial product summation computation of the second group of multiplication, and each Wallace tree in the group may be connected one by one through the carry. In addition, there is no carry relationship between a 23rd Wallace tree in the first group and a 24th Wallace tree in the second group; in other words, there is no carry relationship between Wallace trees in different groups.

Back to FIG. 4, after summing and compressing the partial product through the Wallace tree compressor, a result of the mantissa multiplication operation may be obtained by summing and compressing partial products through the adder. Regarding the adder, in one or a plurality of embodiments of the present disclosure, the adder may include one of adders including a full adder, a serial adder and a carry-lookahead adder. The adder is configured to sum a last two lines of partial products obtained through summation of the Wallace trees to obtain the result of mantissa multiplication operation.

It may be understood that through the mantissa multiplication operation shown in FIG. 4, especially using the Booth encoding and the Wallace tree exemplarily may effectively obtain the result of the mantissa multiplication operation. Specifically, the Booth encoding processing may effectively reduce the number of the partial product sum terms, thereby reducing the circuit area. The Wallace tree compressor may compute a summation of the partial products in each line in parallel, thereby increasing the speed of the multiplier.

The exemplary operation process of the partial product and the 7-2 Wallace tree may be described in detail below by referring to FIG. 5 and FIG. 6. It may be understood that the description here is only exemplary but not restrictive and is only for a better understanding of the present disclosure.

Figure 5:
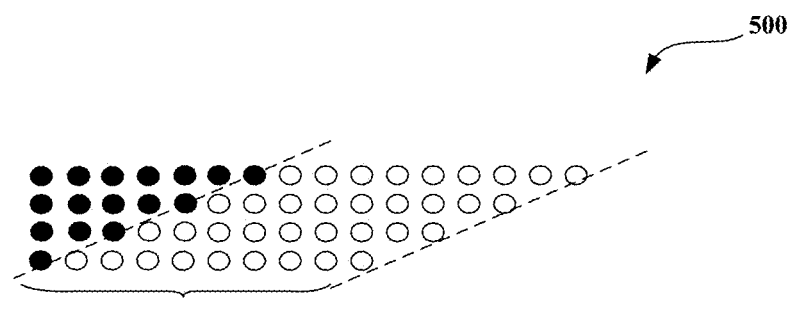
FIG. 5 is a schematic diagram of a partial product operation, according to an embodiment of the present disclosure.

FIG. 5 shows a partial product 500 obtained after passing through the partial product generation circuit in the mantissa processing unit described by referring to FIG. 2 to FIG. 4. In FIG. 5, four lines of white spots are located between two dotted lines, where each line of white spots identifies a partial product. For the convenience of subsequent execution of the Wallace tree, the bit number may be extended in advance. For example, black spots in FIG. 5 are copied highest bit values of each 9-bit partial product. It may be seen that partial products are extended and aligned to 16 (8+8) bits (8 bits of the bit width of the multiplicand mantissa plus 8 bits of the bit width of the multiplier mantissa). In another embodiment, for example, a partial product of a 25*13 binary multiplication is extended to 38 (25+13) bits (25 bits of the bit width of the mantissa of the multiplicand plus 13 bits of the bit width of the mantissa of the multiplier).

Figure 6:
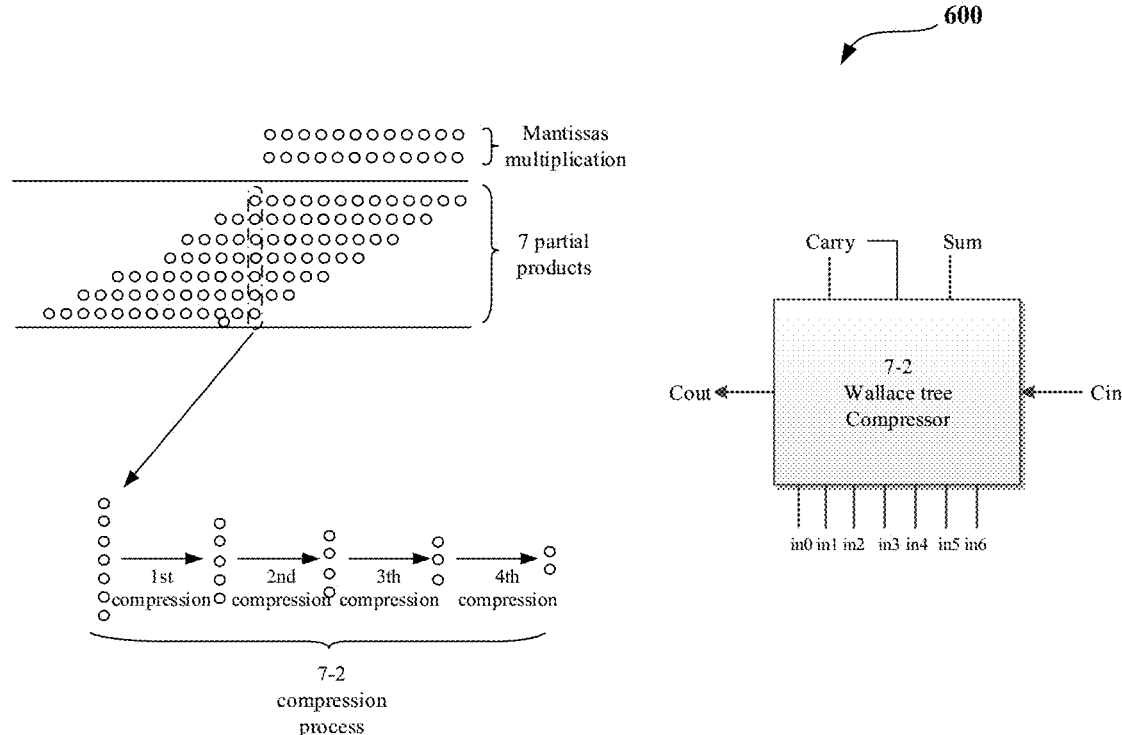
FIG. 6 is a schematic diagram of an operation process of a Wallace tree compressor, according to an embodiment of the present disclosure.

FIG. 6 is a schematic diagram 600 and an operation process of a Wallace tree compressor, according to an embodiment of the present disclosure.

As shown in FIG. 6, after executing multiplication operation on mantissas of two floating-point numbers, such as what mentioned before, seven partial products shown in FIG. 6 may be obtained by encoding the multiplier through the Booth encoding and passing through the multiplicand. Because of the using of a Booth encoding algorithm, a count of generated partial products is reduced. For a better understanding, a Wallace tree that includes seven elements is identified by dashed boxes in the partial product part in FIG. 6. Further, arrows are used to identify the process of compression of the Wallace tree from seven elements to two elements. In an embodiment, the compression process (or the summation process) may be implemented through the full adder, which means inputting three elements and outputting two elements (a sum and a carry to a high bit). The schematic diagram of the 7-2 Wallace tree compressor is shown on the right side of FIG. 6. It is understandable that the Wallace tree compressor includes 7 inputs from a column of partial products (the 7 elements identified by dashed boxes on the left part of FIG. 6). In an operation, the carry input of the 0th column Wallace tree is 0, and the carry output Cout of each column of Wallace tree may be the carry input Cin of Wallace tree in the next column.

It may be seen from the left side of FIG. 6 that after four times of compressions, the Wallace tree that includes 7 elements may be compressed into the Wallace tree that includes 2 elements. As mentioned above, the present disclosure uses the 7-2 Wallace tree compressor to compress a seven-line partial product to a two-line partial product (the second intermediate result of the present disclosure), and the present disclosure uses the adder (such as the carry-lookahead adder) to obtain the mantissa result.

To further explain principles of the present disclosure, the following may describe exemplarily how the multiplier finishes operations in a first stage under four types of computation modes: FP16*FP16, FP16*FP16, FP32*FP32 and FP32*BF16, which means obtaining the second intermediate result until the Wallace tree compressor finishes the summation of the intermediate results.

(1) FP16*FP16

Under the computation mode of the multiplier, the mantissa bit of the floating-point number is 10 bits, and considering a non-normalization and non-zero number under the IEEE754 standard, the mantissa bit may be extended by 1 bit and become 11 bits. In addition, because the mantissa bit is an unsigned number, when using the Booth encoding algorithm, 1 bit 0 may be extended on the high bit; therefore, a total mantissa bit is 12 bits. When executing the Booth encoding on the second floating-point number (the multiplier) with reference to the first floating-point number, 7 partial products may be obtained on the high bit and the low bit through the partial product generation circuit respectively. The 7th partial product is 0, and the bit width of each partial product is 24 bits. At this point, 48 7-2 Wallace trees may be used to perform compression, and a carry from the 23rd to the 24th Wallace tree is 0.

(2) BF16*BF16

Under the computation mode of the multiplier, the mantissa bit of the floating-point number is 7 bits. Considering the non-normalization and non-zero number and extending the number to be the signed number under the IEEE754 standard, the mantissa bit may be extended to 9 bits. When executing the Booth encoding on the second floating-point number (the multiplier) with reference to the first floating-point number, 7 effective partial products may be obtained on the high bit and the low bit respectively through the partial product generation circuit. The 6th partial product and the 7th partial product are 0, and the bit width of each partial product is 18 bits. At this point, two groups of 7-2 Wallace trees, from 0th to a 17th, and from 24th to 41st may be used to perform compression, where the carry from the 23rd to the 24th Wallace tree is 0.

(3) FP32*FP32

Under the computation mode of the multiplier, the mantissa bit of the floating-point number is 23 bits. Considering the non-normalization non-zero number and extending the number to be the signed number under the IEEE754 standard, the mantissa bit may be extended to 25 bits. To save an area of a multiplication unit, for example, a bit width supported by the multiplier may be designed little, and the multiplier of the present disclosure may be called twice under the computation mode to finish one computation. To this end, the multiplication of the mantissa bit of every time is 25 bits*13 bits, which means extending the first floating-point number ina by 1 bit 0 to a signed number, and separating the 24-bit mantissa bit of the second floating-point number inb into 12 bits in the high bit and 12 bits in the low bit, and then respectively extending 1 bit 0 of them to obtain two multipliers with 13 bits represented as inb_high13 in high bit and inb_low13 in low bit. In a specific operation, the multiplier of the present disclosure is called to compute the ina*inb_low13 at the first time, and compute the ina*inb_high13 at the second time. In every computation, the 7 effective partial products are generated through the Booth encoding, and each of the partial product has a bit width of 38 bits and compressed by a 0th to a 37th 7-2 Wallace tree.

(4) FP32*BF16

Under the computation mode of the multiplier, the mantissa bit of the first floating-point number ina is 23 bits, and the mantissa bit of the second floating-point number inb is 7 bits. Considering the non-normalization and non-zero number and extending the number to be the signed number under the IEEE754 standard, the mantissa bit of the first floating-point number and the second floating-point number may be extended into 25 bits and 9 bits respectively to perform 25 bits*9 bits multiplication to obtain the 7 effective partial products. The 6th partial product and the 7th partial product are 0, and each partial product has a bit width of 34 bits, and these partial products are compressed through the 0th to the 33rd Wallace tree.

The above describes through specific examples about how the multiplier of the present disclosure finishes the first stage operation under the four computation modes, where the Booth encoding algorithm and the 7-2 Wallace tree are preferred methods. Based on the above description, those of ordinary skill in the art may understand that the present disclosure uses 7 partial products to reuse the 7-2 Wallace tree in different computation modes.

The situation of multiple callings of the multiplier (the mantissa processing unit and the exponent processing unit) of the present disclosure may be described specifically in the following.

According to another aspect of the present disclosure, as shown in FIG. 3, the mantissa processing unit may include a control circuit 316, which may call the mantissa processing unit multiple times when a mantissa bit width of at least one of the two floating-point numbers is larger than a data bit width that is processable at one time by the mantissa processing unit. The data bit width that is processable by the mantissa processing unit at one time means two bit widths supported by the mantissa processing unit (such as a multiplier bit width and a multiplicand bit width). Therefore, it is understandable that the control circuit is configured to determine calling the mantissa processing unit multiple times to obtain the mantissa after the multiplication computation according to a mantissa bit width of one of the two floating-point numbers and one of the two bit widths supported by the mantissa processing unit, or according to mantissa bit widths of the two floating-point numbers and the two bit widths supported by the mantissa processing unit. Therefore, repeated callings of the mantissa processing unit in the multiplier avoids using a multiplier component with a large area to process a mantissa computation with a large bit width and avoids the problem that a multiplier component with a small area may not process the mantissa computation with the large bit width, which has strong applicability and is beneficial to reduce the area of chip.

According to a first embodiment of the present disclosure, the two floating-point numbers include the first floating-point number and the second floating-point number, and the mantissa processing unit supports the first bit width and the second bit width; the mantissa of the first floating-point number is set as a first input corresponding to the first bit width, and the mantissa of the second floating-point number is set as a second input corresponding to the second bit width; the bit width of the first input is less than or equal to the first bit width, and the control circuit is configured to call the mantissa processing unit multiple times to obtain the mantissa after the multiplication computation when the bit width of the second input is larger than the second bit width.

According to the embodiment, it is known that a bit width of one of the two inputs is fixedly less than or equal to a bit width supported by the corresponding mantissa processing unit. Therefore, it is only required to judge the size relationship of a bit width supported by another input and the bit width supported by the corresponding mantissa processing unit, and therefore, whether calling the mantissa processing unit multiple times may be determined.

According to a second embodiment of the present disclosure, the two floating-point numbers include the first floating-point number and the second floating-point number, and the mantissa processing unit supports the first bit width and the second bit width; the mantissa of the first floating-point number is set as the first input corresponding to the first bit width, and the mantissa of the second floating-point number is set as the second input corresponding to the second bit width; the control circuit is configured to call the mantissa processing unit multiple times to obtain the mantissa after the multiplication computation when the bit width of the first input is larger than the first bit width, and the bit width of the second input is larger than the second bit width, and the bit width of the first input is less than or equal to the first bit width, or when the bit width of the first input is larger than the first bit width and the bit width of the second input is larger than the second bit width. According to the embodiment, the size relationship of bit widths of two inputs and the two bit widths supported by the mantissa processing unit is uncertain. Therefore, before determining whether calling the mantissa processing unit multiple times, it is required to judge the size relationship of bit widths supported by the two inputs and their corresponding bit widths supported by the mantissa processing units.

According to the second embodiment of the present disclosure, when the bit width of the mantissa of the first floating-point number is less than the bit width of the mantissa of the second floating-point number and when the first bit width is larger than the second bit width, or when the bit width of the mantissa of the first floating-point number is larger than the bit width of the mantissa of the second floating-point number, and the first bit width is less than the second bit width, the control circuit selects the mantissa of the first floating-point number as the second input corresponding to the second bit width, and selects the mantissa of the second floating-point number as the first input corresponding to the first bit width. It should be understood that when the mantissas of the two floating-point numbers are input irregularly, the mantissas of the two input floating-point numbers may be matched to the two bit widths supported by the mantissa processing unit according to a strategy that one large bit width matches another one large bit width, and one small bit width matches another one small bit width. This may avoid a plurality of callings of the mantissa processing unit in the mantissa computation of the two floating-point numbers that supposed to be processed at one time.

Further, when the bit width of the first input is larger than the first bit width and the bit width of the second input is less than or equal to the second bit width, the control circuit determines the number of callings of the mantissa processing unit and the data input into the mantissa processing unit in each calling according to the bit width of the first input and the first bit width. When the bit width of the second input is larger than the second bit width and the bit width of the first input is less than or equal to the first bit width, the control circuit determines the number of callings of the mantissa processing unit and the data input into the mantissa processing unit in each calling according to the bit width of the second input and the second bit width. When the bit width of the first input is larger than the first bit width and the bit width of the second input is larger than the second bit width, the control circuit determines the number of callings of the mantissa processing unit and the data input into the mantissa processing unit in each calling according to the bit width of the first input and the first bit width, and the bit width of the second input and the second bit width.

In the present disclosure, descriptions of the first floating-point number and the second floating-point number are only used to distinguish the two floating-point numbers, where "first" and "second" are not restrictive. Similarly, descriptions of the first bit width and the second bit width are only used to distinguish two largest processing bit widths supported by the mantissa processing unit, and descriptions of the first input and the second input are only used to distinguish two inputs corresponding to the two largest processing bit widths of the mantissa processing unit, and therefore, the"first" and the "second" are not restrictive.

It is worth noting that a floating-point number input into the multiplier described in the above embodiments is a floating-point number that meets a required computation format and is applicable to internal and external components of the multiplier; in other words, the floating-point number is a floating-point number that has gone through such preprocessing as normalization. It should be understood that the floating-point number that is input into the multiplier may be a normalized or a non-normalized floating-point number. It may be known by referring to the above description about the normalization unit that if as least one of the two input floating-point numbers is a non-normalized and non-zero floating-point number, the normalization unit may be used first to perform normalization processing on at least one floating-point number to obtain a normalized exponent and a normalized mantissa, and then the normalized mantissa may be used as the input of the mantissa processing unit to perform the above-mentioned floating-point number multiplication computation. In addition, a signed fixed-point number multiplication computation is performed through the Booth encoding circuit that mentioned before in the present disclosure, so that 1-bit 0 needs to be extended before the mantissa, which means changing the mantissa into a signed positive number, and then using the extended signed mantissa as the input of the mantissa processing unit to perform the above-mentioned floating-point number computation. Certainly, other preprocessing may be performed on the floating-point number, and the mantissa of the preprocessed floating-point number may be used as the input of the mantissa processing unit to perform the above-mentioned floating-point number multiplication computation. For example, the above-mentioned description about the normalization unit has mentioned that the floating-point number has been normalized to apply to the computation mode, and the first embodiment and the second embodiment are also applicable to the above-mentioned floating-point number computation according to the computation mode.

Three examples of calling the mantissa processing unit multiple times according to the above-mentioned second embodiment of the present disclosure may be described in detail below. To more directly and obviously understand the three embodiments, for example, the above-mentioned first input may be the multiplier and the second input may be the multiplicand; the first bit width may be the largest multiplier bit width supported by the mantissa processing unit and the second bit width may be the largest multiplicand bit width supported by the mantissa processing unit.

According to the first embodiment of calling the mantissa processing unit multiple times of the present disclosure and by referring to the floating-point multiplication computation according to the computation mode, for example, when the two floating-point numbers that are input into the multiplier of the present disclosure are non-normalized and non-zero floating-point numbers and by referring to a case that the present disclosure uses the Booth encoding circuit to perform a signed fixed-point number multiplication computation, the two floating-point numbers may first be normalized, and therefore the mantissas of the two floating-point numbers may be extended by one bit; in addition, the two mantissas may be extended by one bit to form signed numbers in order to be applicable to the Booth encoding circuit of the embodiments of the present disclosure. After preprocessing, the mantissas of the two floating-point numbers and the input of the mantissa processing unit may be matched. Therefore, when the bit width of the multiplier is larger than the largest multiplier bit width and the bit width of the multiplicand is less than or equal to the largest multiplicand, the control circuit takes the mantissa formed after normalizing the original mantissa corresponding to the multiplier as a to-be-intercepted mantissa, and each interception part is extended in the sign bit in order to be applicable to the Booth encoding circuit of the embodiments of the present disclosure. To make the mantissa processing unit be able to process the to-be-intercepted mantissa, a part with A−1 bit width from the to-be-intercepted mantissa may be intercepted, where A represents the largest multiplier bit width supported by the mantissa processing unit, and 1-bit 0 may be added to the high bit in the intercepted part with A−1 bit width as a sign to form a multiplier part with A bit width, and the multiplier part is set as an input that is input into the mantissa processing unit in each calling. In addition, the multiplicand (in this embodiment, the multiplicand is a normalized mantissa with an extended sign bit) is input into the mantissa processing unit as another input in each time of calling. Therefore, the following formula may be used to determine the number of times of calling the mantissa processing unit:

$$n = \mathrm{ceil}\left((B+1)/(A-1)\right).$$

In this formula, n represents the number of times of calling the mantissa processing unit, and B represents a bit width of a non-normalized mantissa without extending the sign bit; B+1 represents the bit width of the normalized mantissa, and B+1 may be understood as B+2−1, which means that the bit width of the multiplier subtracts the bit width of the sign bit; A represents the bit width of the multiplier part (the largest multiplier bit width supported by the mantissa processing unit), and A−1 represents the bit width of the part intercepted from the to-be-intercepted mantissa in each calling.

For example, if the largest multiplier bit width supported by the mantissa processing unit is 8 bits, the largest multiplicand bit width is 32 bits, and the two floating-point numbers that are input into the multiplier is the floating-point numbers of FP32 type and BF16 type, the multiplication computation is determined to be performed in FP32*BF16 computation mode; because the two floating-point numbers are the non-normalized and non-zero numbers, the mantissas of the two floating-point numbers have 23 bits and 7 bits as the bit widths respectively, and the bit widths of the two mantissas may be extended to 24 bits and 8 bits respectively considering the IEEE754 standard. To be applicable to the Booth encoding circuit of the embodiments of the present disclosure, the two mantissas may be extended by 1-bit 0 to be a 25 bits signed number and a 9 bits signed number respectively. Therefore, the control circuit sets the mantissa with a bit width of 9 bits as the multiplier corresponding to the largest multiplier bit width and sets the mantissa with a bit width of 25 bits as the multiplicand corresponding to the largest multiplicand bit width; because only the bit width of the multiplier (9 bits) is larger than the largest multiplier bit width (8 bits), yet the bit width of the multiplicand (25 bits) is less than the largest multiplicand bit width (32 bits), the normalized original mantissa corresponding to the multiplier is set as the to-be-intercepted mantissa inb, and the multiplicand is set as the multiplicand ina that is input into the mantissa processing unit. According to the above formula, ceil ((7+1)/(8−1))=2. Therefore, the mantissa processing unit needs to be called twice, and 7-bit data in inb may be intercepted in each calling. At the last calling (the second calling), if the data is less than 7 bits, all the left data may be intercepted and 0 may be added to the front to make the left data be 7-bit data. In addition, the 7-bit data intercepted each time may be extended by 1-bit 0 (the sign bit) to be 8-bit data and set as the multiplier part inb_m. Therefore, the computation performed at each calling is ina*inb_m; in other words, the multiplicand with the bit width of 25 bits multiplies the multiplier part with the bit width of 8 bits to obtain a mantissa result of this calling. It is worth noting that the to-be-intercepted mantissa may be intercepted from the high bit to the low bit or from the low bit to the high bit. It is worth noting that this embodiment is also applicable to the first embodiment of the present disclosure.

According to the second embodiment of calling the mantissa processing unit multiple times of the present disclosure and by referring to the floating-point multiplication computation according to the computation mode, taking the example that the two floating-point numbers that are input into the multiplier of the present disclosure are non-normalized and non-zero floating-point numbers and by referring to the case that the present disclosure uses the Booth encoding circuit to perform signed fixed-point number multiplication computation, the two floating-point numbers may be normalized first, so that the mantissas of the two floating-point numbers may be extended by one bit; in addition, the two mantissas may be extended by 1 bit to form signed numbers in order to be applicable to the Booth encoding circuit of the embodiments of the present disclosure. After these preprocessing, the mantissas of the two floating-point numbers and the inputs of the mantissa processing unit may be matched. Therefore, when the bit width of the multiplicand is larger than the largest multiplicand bit width, and the bit width of the multiplier is less than or equal to the largest multiplier bit width, the control circuit uses a normalized original mantissa corresponding to the multiplicand as a to-be-intercepted mantissa, and each interception part is extended in the sign bit to make them apply to the Booth encoding circuit of the embodiments of the present disclosure. To let the mantissa processing unit process the to-be-intercepted mantissa, a part with C−1 bit width may be intercepted from the mantissa, where C represents the largest multiplicand bit width supported by the mantissa processing unit, and 1-bit 0 may be added to the high bit in the intercepted part with C−1 bit width as a sign to form a multiplicand part with C bit width, and the multiplicand part is set as an input that is input into the mantissa processing unit in each calling. In addition, the multiplier (in this embodiment, the multiplier is a normalized mantissa with extended sign bit) is input into the mantissa processing unit as another input in each calling. Therefore, the following formula may be used to determine the number of callings of the mantissa processing unit.

$$n = \mathrm{ceil}\left((D+1)/(C-1)\right),$$

In this formula, n represents the number of times of calling the mantissa processing unit, and D represents a non-normalized bit width without extending the sign bit of the mantissa; D+1 represents the bit width of the normalized mantissa, and D+1 may be understood as D+2−1, which means that the bit width of the multiplicand subtracts the bit width of the sign bit; C represents the bit width of the multiplicand part (the largest multiplicand bit width supported by the mantissa processing unit), and C−1 represents the bit width of the part intercepted from the to-be-intercepted mantissa in each calling.

For example, if the largest multiplier bit width supported by the mantissa processing unit is 12 bits, the largest multiplicand bit width is 16 bits, and the two floating-point numbers that are input into the multiplier are the floating-point numbers of FP32 type and BF16 type, the multiplication computation is determined to be performed in the FP32*BF16 computation mode; because the two floating-point numbers are non-normalized non-zero numbers, the mantissas of the two floating-point numbers have 23 bits and 7 bits as bit widths, and the bit widths of the two mantissas may be extended to 24 bits and 8 bits when considering the IEEE754 standard. To be applicable to the Booth encoding circuit of the embodiments of the present disclosure, the two mantissas may be extended by 1-bit 0 to be the 25-bit signed number and the 9-bit signed number. Therefore, the control circuit sets the mantissa with a bit width of 9 bits as the multiplier corresponding to the largest multiplier bit width, and sets the mantissa with a bit width of 25 bits as the multiplicand corresponding to the largest multiplicand bit width; because only the bit width of the multiplicand (25 bits) is larger than the largest multiplicand bit width (16 bits), but the bit width of the multiplier (9 bits) is less than the largest multiplier bit width (12 bits), the normalized original mantissa corresponding to the multiplicand is set as the to-be-intercepted mantissa ina, and the multiplier is set as the multiplier inb input into the mantissa processing unit. According to the formula, ceil ((23+1)/(16−1))=2. Therefore, the mantissa processing unit needs to be called twice, and 15-bit data in ina may be intercepted in each calling. At the last calling (the second calling), if the data is less than 15 bits, all the left data may be intercepted and 0 may be added to the front to make the left data be 15-bit data. In addition, the 15-bit data intercepted each time may be extended by 1-bit 0 (sign bit) to be 16-bit data and set as the multiplicand part inb_m. Therefore, the computation performed at each calling is ina_m*inb; in other words, the multiplicand with the bit width of 16-bit multiplies the multiplier part with the bit width of 9 bits to obtain a mantissa result of this calling. It is worth noting that the to-be-intercepted mantissa may be intercepted from the high bit to the low bit or from the low bit to the high bit. It is worth noting that this embodiment is also applicable to the first embodiment of the present disclosure.

According to the third embodiment that calls the mantissa processing unit multiple times of the present disclosure and by referring to the floating-point multiplication computation according to the computation mode, taking the example that the two floating-point numbers that are input into the multiplier of the present disclosure are non-normalized and non-zero floating-point numbers and by referring to the case that the present disclosure uses the Booth encoding circuit to perform signed fixed-point number multiplication computation, the two floating-point numbers may be normalized first, so that the mantissas of the two floating-point numbers may be extended by one bit; in addition, the two mantissas may be extended by 1 bit to form signed numbers in order to be applicable to the Booth encoding circuit of the embodiments of the present disclosure. After these preprocessing, the mantissas of the two floating-point numbers and the input of the mantissa processing unit may be matched. Therefore, when the bit width of the multiplier is larger than the largest multiplier bit width and the bit width of the multiplicand (in this embodiment, the multiplicand is a normalized mantissa with extension in the sign bit) is larger than the largest multiplicand bit width, the control circuit uses a normalized original mantissa corresponding to the multiplier and a normalized original mantissa corresponding to the multiplicand as to-be-intercepted mantissas, and each interception part is extended in the sign bit to apply to the Booth encoding circuit of the embodiments of the present disclosure. To let the mantissa processing unit process the two to-be-intercepted mantissas, a part with A−1 bit width may be intercepted from the to-be-intercepted mantissa corresponding to the multiplier, and a part with C−1 bit width may be intercepted from the to-be-intercepted mantissa corresponding to the multiplicand, where A represents the largest multiplier bit width supported by the mantissa processing unit. And C represents the largest multiplicand bit width supported by the mantissa processing unit. 1-bit 0 may be added to the high bit in the intercepted part with C−1 bit width as a sign to form a multiplicand part with C bit width, and the multiplicand part is set as another input that is input into the mantissa processing unit in each calling. Therefore, the following formula may be used to determine the number of times of calling the mantissa processing unit.

$$n = \mathrm{ceil}\left((B+1)/(A-1)\right) * \mathrm{ceil}\left((D+1)/(C-1)\right).$$

In this formula, n represents the number of times of calling the mantissa processing unit, and B represents non-normalized bit width without extending the sign bit of the mantissa; B+1 represents the bit width of the normalized mantissa, and B+1 may be understood as B+2−1, which means that the bit width of the multiplier subtracts the bit width of the sign bit; A represents the bit width of the multiplier part (the largest multiplier bit width supported by the mantissa processing unit), and A−1 represents the bit width of the part intercepted from the to-be-intercepted mantissa corresponding to the multiplier in each calling; D represents non-normalized bit width without extending the sign bit of the mantissa, and D+1 represents the bit width of the normalized mantissa; D+1 may be understood as D+2−1, which means that the bit width of the multiplicand subtracts the bit width of the sign bit, and C represents the bit width of the multiplicand part (the largest multiplicand bit width supported by the mantissa processing unit); C−1 represents the bit width of the part intercepted from the to-be-intercepted mantissa in each calling.

For example, if the largest multiplier bit width supported by the mantissa processing unit is 8 bits, the largest multiplicand bit width is 16 bits, and the two floating-point numbers that are input into the multiplier is the floating-point numbers of FP32 type, the multiplication computation is determined to be performed in FP32*FP32 computation mode; because the two floating-point numbers are non-normalized and non-zero numbers, the mantissas of the two floating-point numbers have 23 bits as bit widths, and the bit widths of the two mantissas may be extended to be 24-bit when considering the IEEE754 standard. To be applicable to the Booth encoding circuit of the embodiments of the present disclosure, the two mantissas may be extended by 1-bit 0 to be 25-bit signed numbers. Therefore, the control circuit respectively selects the mantissas of the two floating-point numbers as the multiplier corresponding to the largest multiplier bit width and the multiplicand corresponding to the largest multiplicand bit width (since the mantissas of the two floating pint numbers are the same in bit width after extending, one should be selected as the multiplier and the other is selected as the multiplicand); because the bit width of the multiplier (25 bits) is larger than the largest multiplier bit width (8 bits), and the bit width of the multiplicand (25 bits) is larger than the largest multiplier bit width (16 bits), the normalized original mantissa corresponding to the multiplier is set as the to-be-intercepted mantissa inb, and the normalized original mantissa corresponding to the multiplicand is set as the to-be-intercepted mantissa ina. According to the above formula, ceil ((23+1)/(8−1))*ceil ((23+1)/(16−1))=8, so that the mantissa processing unit needs to be called for eight times. 7-bit data in inb may be intercepted in each calling. At the last calling, if the bit width of the data is less than 7 bits, all the left data may be intercepted and zeros may be added to the front to make the left data be 7-bit data. In addition, the 7-bit data intercepted each time may be extended by 1-bit 0 (the sign bit) to be 8-bit data and set as the multiplier part inb_m. Because inb is intercepted into four parts, there may be four multiplier parts, including inb_m1, inb_m2, inb_m3 and inb_m4. In addition, 15-bit data in ina may be intercepted in each calling. At the last calling, if the bit width of the data is less than 15 bits, all the left data may be intercepted and zeros may be added to the front to make the left data be 15-bit data, and the 15-bit data intercepted each time may be extended by 1-bit 0 (the sign bit) to be 16-bit data and set as the multiplicand part ina_m. Because ina is intercepted into two parts, so that ina may have two multiplicand parts, including ina_m1 and ina_m2. Therefore, for example, the following computations may be performed orderly when calling the mantissa processing unit for eight times: ina_m1*inb_m1, ina_m1*inb_m2, ina_m1*inb_m3, ina_m1*inb_m4, ina_m2*inb_m1, ina_m2*inb_m2, ina_m2*inb_m3, ina_m2*inb_m4; or the following computations may be performed orderly: inb_m1*ina_m1, inb_m1*ina_m2, inb_m2*ina_m1, inb_m2*ina_m2, inb_m3*ina_m1, inb_m3*ina_m2, inb_m4*ina_m1, inb_m4*ina_m2. The computation performed at each calling is the multiplication computation of the multiplicand part with a bit width of 16 bits and the multiplier part with a bit width of 8 bits, thereby the mantissa result obtained through the calling may be computed. It is worth noting that the to-be-intercepted mantissa may be intercepted from the high bit to the low bit or from the low bit to the high bit.

The above examples are only for illustrative but not restrictive purposes. According to these examples, those of ordinary skill in the art may think about executing floating-point number multiplication computation by calling the largest supported mantissa processing unit with arbitrary bit width multiple times in other computation modes.

For the plurality of callings of the mantissa processing unit, the mantissa processing unit may include a shift addition circuit, which is configured to obtain the mantissa after the multiplication computation according to the mantissa result obtained after each calling of the mantissa processing unit.

Further, the shift addition circuit includes a shifter, an intermediate memory and an adder. When the control circuit calls the mantissa processing unit multiple times according to the computation mode, after the first calling, the shifter shifts the mantissa result obtained after the first calling to obtain a shifted mantissa result and stores the shifted mantissa result into the intermediate memory. From the second calling, the shifter shifts the mantissa result obtained in the second calling to obtain a second mantissa result. The adder adds the second mantissa result to the result stored in the intermediate memory, and then stores the result in the intermediate memory to update the intermediate memory, and the result stored in the intermediate memory after the last calling is set as the mantissa of the multiplication computation.

In this embodiment, for example, the to-be-intercepted mantissa may be intercepted from the high bit to the low bit. When calling the mantissa processing unit each time, the shifter shifts the obtained mantissa results in the calling according to the following formula:

$$Y = k + j.$$

In this formula, Y represents a shift count of the obtained mantissa result in the calling, and k represents the sum of bits of all data that located after the intercepted part and used in the current call in the to-be-truncated mantissa corresponding to the multiplier, j represents the sum of bits of all data that located after the intercepted part and used in the current call in the to-be-truncated mantissa corresponding to the multiplicand. It should be understood that if only the bit width of the multiplier is larger than the largest multiplier bit width or only the bit width of the multiplicand is larger than the largest multiplicand bit width, only the to-be-intercepted mantissa corresponding to the multiplier or the to-be-intercepted mantissa corresponding to the multiplicand needs to be intercepted, and for those mantissas that need no interception, all data of them may be used in each calling. Therefore, there is no data afterward, so that the value of k and j may be 0. It should be known for the case where only the bit width of the multiplier is larger than the largest multiplier bit width, the above formula for computing the shift count may be written as Y=k, and for the case where only the bit width of the multiplicand is larger than the largest multiplicand bit width, the above formula for computing the shift count may be written as Y=j.

For example, as mentioned before, in the FP32*BF16 computation mode, when only the bit width of the multiplier is larger than the largest multiplier bit width, the mantissa processing unit may be called twice, and for example, the to-be intercepted mantissa is intercepted from the high bit to the low bit. Specifically, for example, the multiplier parts in the two callings are respectively inb_m1 and inb_m2. After the first calling, the shifter shifts the result of ina*inb_m1 to the left. Because 7-bit data is intercepted in the first calling, a sum of bits of all data after the 7-bit data used in this calling is k=8−7=1 bit. It may be known from the above formula that Y=1, so that the result of ina*inb_m2 is shifted one bit to the left to obtain the result R1, and the adder stores R1 into the intermediate memory. After the second calling (the last calling), the shifter shifts the result of ina*inb_m2 to the left. Because the last bit of data is intercepted in the second calling, there is no data after the last bit of data used in this call. It may be known from the above formula that Y=0, so that the result of ina*inb_m2 is shifted 0 bit to the left (no shift) to obtain the result R2. The adder adds R2 to R1 stored in the intermediate memory, and stores the addition result into the intermediate memory to update the intermediate memory. Because the second calling is the last calling, the result stored in the intermediate memory after the second calling is the mantissa of the multiplication computation. For the above-mentioned case where when only the bit width of the multiplicand is larger than the largest multiplicand bit width, the shift addition circuit may also work like this.

For example, as mentioned before, in the FP32*FP32 computation mode, when the bit width of the multiplier is larger than the largest multiplier bit width and the bit width of the multiplicand is larger than the largest multiplicand bit width, the mantissa processing unit may be called for eight times, and for example, the to-be intercepted mantissa is intercepted from the high bit to the low bit. Specifically, for example, in the eight-time callings, the multiplier parts are respectively inb_m1, inb_m2, inb_m3 and inb_m4, and the multiplicand parts are respectively ina_m1 and ina_m2. For example, the following computations may be performed orderly in the eight-time callings of the mantissa processing unit: ina_m1*inb_m1, ina_m1*inb_m2, ina_m1*inb_m3, ina_m1*inb_m4, ina_m2*inb_m1, ina_m2*inb_m2, ina_m2*inb_m3 and ina_m2*inb_m4. In the first calling, the shifter shifts the result of ina_m1*inb_m1 to the left. Because 7-bit data has been intercepted from the to-be-intercepted mantissa corresponding to the multiplier in the first calling, a sum of bits of all data after the 7 bits data of the to-be-intercepted mantissa used in this calling is k=24−7=17 bits, and 15-bit data has been intercepted from the to-be-intercepted mantissa corresponding to the multiplicand, a sum of bits of all data after the 15-bit data used in this calling is j=24−15-9 bits. According to the above formula, Y=17+9=26, so that the result of ina_m1*inb_m1 is shifted 26 bits to the left to obtain the result S1, and the adder stores S1 into the intermediate memory. After the second calling, the shifter shifts the result of ina_m1*inb_m2 to the left. Because 7-bit data has been intercepted from the to-be-intercepted mantissa corresponding to the multiplier in the second calling, a sum of bits of all data after the 7-bit data of the to-be-intercepted mantissa used in this calling is k=24-7−7=10 bits, and the same 7-bit data (the same 7-bit data as the first calling) has been intercepted from the to-be-intercepted mantissa corresponding to the multiplicand, so that a sum of bits of all data after the 7-bit data of the to-be-intercepted mantissa used in this calling is j=24−15=9 bits. According to the above formula, Y=10+9=19, so that the result of ina_m1*inb_m2 is shifted 19 bits to the left to obtain the result S1, and the adder adds S2 to the S1 stored in the intermediate memory, and stores the addition result in the intermediate memory to update the intermediate memory. The callings of the mantissa processing unit may be repeated to the fourth calling. In the fourth calling, the shifter shifts the result of ina_m1*inb_m4 to the left. Because the last 3-bit data has been intercepted from the to-be-intercepted mantissa corresponding to the multiplier in the fourth calling, there is no data after the 3-bit data of the to-be-intercepted mantissa used in this calling, so that k=0; and the same 7-bit data as the third calling has been intercepted from the to-be-intercepted mantissa corresponding to the multiplicand, so that a sum of bits of all data after the 7-bit data of the to-be-intercepted mantissa used in this calling is $j=24-15=9$ bits. According to the above formula, $Y=0+9=9$, so that the result of ina_m1*inb_m4 is shifted 9 bits to the left to obtain the result S4, and the adder adds S4 to the result in the intermediate memory and stores the result in the intermediate memory to update the intermediate memory. Because the last 9-bit data of the to-be-intercepted mantissa corresponding to the multiplicand is intercepted from the fifth calling to the eighth calling, there is no data after the 9-bit data, so that $j-0$, from the fifth calling to the eighth calling. In the fifth calling, the shifter shifts the result of ina_m2*inb_m1 to the left. Since the same 7-bit data as the first calling of the to-be-intercepted mantissa corresponding to the multiplier is intercepted in the fifth calling, $k=24-7=17$ bits. It should be known from the above formula that $Y=17+0=17$, so that the result of ina_m2*inb_m1 is shifted 17 bits to the left to obtain the result S5, and the adder adds S5 to the result stored in the intermediate memory, and stores the addition result in the intermediate memory to update the intermediate memory. The callings of the mantissa processing unit may be repeated to the eighth calling. In the eighth calling, the shifter shifts the result of ina_m2*inb_m4 to the left. Because the last 3-bit data has been intercepted from the to-be-intercepted mantissa corresponding to the multiplier in the eighth calling, there is no data after the 3-bit data of the to-be-intercepted mantissa used in this calling, so that $k-0$. According to the above formula, $Y=0+0=9$, so that the result of ina_m2*inb_m4 is shifted 0 bits to the left (no shift) to obtain the result S8, and the adder adds S8 to the result in the intermediate memory and stores the addition result in the intermediate memory to update the intermediate memory. Since the eighth calling is the last calling, the result stores in the intermediate memory after the eighth calling is the mantissa of the multiplication computation.

On the other hand, to further reduce the area of the multiplier, the exponent processing unit includes a second control circuit (which is not shown in the figure), and the second control circuit is configured to determine calling the exponent processing unit multiple times to obtain the exponent after the multiplication computation according to an exponent bit width of one of the two floating-point numbers and one of the two bit widths supported by the exponent processing unit or according to the exponent bit widths of the two floating-point numbers and the two bit widths supported by the exponent processing unit.

According to a third embodiment of the present disclosure, the two floating-point numbers include a first floating-point number and a second floating-point number, and the exponent processing unit supports a third bit width and a fourth bit width; an exponent of the first floating-point number is set as a third input corresponding to the third bit width, and an exponent of the second floating-point number is set as a fourth input corresponding to the fourth bit width; a bit width of the third input is less than or equal to the third bit width, and the second control circuit is configured to call the exponent processing unit multiple times to obtain the exponent after the multiplication computation when the bit width of the fourth input is larger than the fourth bit width. According to the embodiment, it is known that a bit width of one of the two inputs is smaller than or equal to a bit width supported by a corresponding exponent processing unit. Therefore, whether calling the exponent processing unit multiple times may be determined as long as determining whether another input is larger than the bit width supported by the corresponding exponent processing unit.

According to a fourth embodiment of the present disclosure, the two floating-point numbers include the first floating-point number and the second floating-point number, and the exponent processing unit supports the third bit width and the fourth bit width; the exponent of the first floating-point number is set as a third input corresponding to the third bit width, and the exponent of the second floating-point number is set as a fourth input corresponding to the fourth bit width; the second control circuit is configured to call the exponent processing unit multiple times to obtain the exponent after the multiplication computation when the bit width of the third input is larger than the third bit width and the bit width of the fourth input is less than or equal to the fourth bit width, and when the bit width of the fourth input is larger than the fourth bit width and the bit width of the third input is less than or equal to the third bit width or when the bit width of the third input is larger than the third bit width and the bit width of the fourth input is larger than the fourth bit width. According to the embodiment, the size relationship of the bit widths of two inputs and the two bit widths supported by the exponent processing unit is uncertain. Therefore, before determining whether to call the exponent processing unit multiple times, the size relationship of the two inputs and their corresponding exponent processing units should be determined.

According to the fourth embodiment of the present disclosure, when the bit width of the exponent of the first floating-point number is less than the bit width of the exponent of the second floating-point number and when the third bit width is larger than the fourth bit width, or when the bit width of the exponent of the first floating-point number is larger than the bit width of the exponent of the second floating-point number and the third bit width is less than the fourth bit width, the second control circuit selects the exponent of the first floating-point number as the fourth input corresponding to the fourth bit width, and selects the exponent of the second floating-point number as the third input corresponding to the third bit width. It should be understood that when the exponents of the two floating-point numbers are input irregularly, the exponents of the two input floating-point numbers may be matched to the two bit widths supported by the exponent processing unit according to a strategy that one large bit width matches another large bit width, and one small bit width matches another small bit width. This may avoid a plurality of callings of the exponent processing unit in the exponent computation of the two floating-point numbers that supposed to be processed at one time.

Further, when the bit width of the third input is larger than the third bit width and the bit width of the fourth input is less than or equal to the fourth bit width, and the bit width of the fourth input is larger than the fourth bit width and the bit width of the third input is less than or equal to the third bit width or when the bit width of the third input is larger than the third bit width and the bit width of the fourth input is larger than the fourth bit width, the second control circuit is configured to determine the number of times of calling the exponent processing unit and data input into the exponent processing unit at each calling when the bit width of the third input is less than or equal to the bit width of the fourth input and the third bit width is less than or equal to the fourth bit width. It is worth noting that under the three cases above, the number of times of calling the exponent processing unit is determined according to the larger one between the bit width of the third input and the bit width of the fourth input, and the data input into the exponent processing unit in each calling is determined according to the smaller one between the third bit width and the fourth bit width. Certainly, when the bit width of the third input and the fourth input are the same, or when the third bit width and the fourth bit width are the same, one of the two with the same bit width may be selected.

In this embodiment, descriptions of the first floating-point number and the second floating-point number are only used to distinguish the two floating-point numbers, where "third" and "fourth" are not restrictive. Similarly, descriptions of the third input and the fourth input are only used to distinguish the two inputs of the exponent processing unit, and descriptions of the third bit width and the fourth bit width are only used to distinguish two largest processing bit width corresponding to the two inputs of the exponent processing unit supported by the exponent processing unit, where the "third" and the "fourth" are not restrictive.

It is worth noting that a floating-point number input into the multiplier described in the above embodiments is a floating-point number that meets a required computation format and is applicable to internal and external components of the multiplier; in other words, the floating-point number is a floating-point number that has gone through such preprocessing as normalization. It should be understood that the floating-point number that is input into the multiplier may be a normalized or non-normalized floating-point number. It may be known by referring to the above description about normalization unit that if as least one of the two input floating-point numbers is a non-normalized and non-zero floating-point number, the normalization unit may be first used to perform normalization processing on at least one floating-point number to obtain the normalized exponent and mantissa, and then the normalized exponent may be used as the input of the exponent processing unit to perform the above-mentioned floating-point number multiplication computation. Certainly, other preprocessing may be performed on the floating-point number, and the exponent of the preprocessed floating-point number may be used as the input of the exponent processing unit to perform the above-mentioned floating-point number multiplication computation. For example, the above-mentioned description about normalization unit has mentioned that the floating-point number has been normalized to apply to the computation mode, and the third embodiment and the fourth embodiment of the present disclosure are also applicable to the above-mentioned floating-point number computation according to the computation mode.

The example of calling the exponent processing unit multiple times may be described in detail in the following. To more directly and obviously understand the example, for example, the above-mentioned third input may be an addend and the fourth input may be an augend, and the third bit width may be the largest addend bit width supported by the exponent processing unit and the fourth bit width may be the largest augend bit width supported by the exponent processing unit.

According to the example of calling the exponent processing unit multiple times of the present disclosure and by referring to the floating-point multiplication computation according to the computation mode of the above description, taking the example that the two floating-point numbers input into the multiplier of the present disclosure are non-normalized non-zero floating-point numbers, the two floating-point numbers may be normalized first, so that the mantissas of the two floating-point numbers may be extended by one bit. After these preprocessing, the exponents of the two floating-point numbers and the inputs of the exponent processing unit may be matched. Therefore, when a bit width of the addend is larger than the largest addend bit width and a bit width of the augend is less than or equal to the largest augend bit width, and when the bit width of the augend is larger than the largest augend bit width and the bit width of the addend is less than or equal to the largest addend bit width or when the bit width of the addend is larger than the largest addend bit width and the bit width of the augend is larger than the largest augend bit width, the control circuit may determine the number of times of calling the exponent processing unit according to the following formula:

$$m = \mathrm{ceil}\left(P/(Q-1)\right).$$

In this formula, m represents the number of times of calling the exponent processing unit, and P represents the bit width of the augend; Q represents the largest addend bit width, and Q−1 represents bit widths of parts intercepted from the addend and the augend in each calling. In each calling, a part with Q−1 bit width from both the addend and the augend may be intercepted, and summation computation may be performed on these two parts with the same bit width and the same bits; if the bit width of the data of the intercepted part in the calling is less than Q−1 bit, or there is no data, zeros may be added to the front or to all bits to make the data of the intercepted part be data with Q−1 bit. After extending one carry in the front of the intercepted parts from the addend and the augend, an addend part and an augend part input into the exponent processing unit are formed. Therefore, Q also represents bit widths of the addend part and the augend part input into the exponent processing unit in each calling.

Therefore, when calling the exponent processing unit each time, the second control circuit intercepts a part of Q−1 bits from both the addend and the augend according to the same order and sets the two parts as inputs of the exponent processing unit. The exponent result of this calling may be obtained through the exponent processing unit, and the final exponent may be obtained after calling the exponent processing unit for m times. It is worth noting that the above-mentioned same order may be the order from the high bit to the low bit or from the low bit to the high bit.

For example, the bit width of the addend is 6 bits, and the bit width of the augend is 9 bits; the largest addend bit width and the largest augend bit width supported by the exponent processing unit are 8 bits. Therefore, the number of times of calling the exponent processing unit is ceil (9/(8−1))−2. First zeros may be added to the front of the addend to let the addend and the augend have the same bit width, and two parts with 7 bit widths are intercepted from the addend and the augend in each calling according to the order from the high bit to the low bit, and a carry bit of these two intercepted parts are respectively extended to form two 8-bit data with carry bits, and these two data are added together; at the second calling (the last calling), only 2-bit data (only 2-bit data are left) may be intercepted from the addend and the augend; therefore, zeros may be added to the front of the 2-bit intercepted data to make the data be 7-bit, and two 8-bit data with carry bit are formed after extending one carry bit, and these two data are added together.

It is worth noting that in this example, when the bit width of the addend is larger than the largest addend bit width and the bit width of the augend is less than or equal to the largest augend bit width, and when the bit width of the augend is larger than the largest augend bit width and the bit width of the addend is less than or equal to the largest addend bit width, the method of calling the exponent processing unit is also applicable to the third embodiment of the present disclosure.

According to the embodiment, the exponent processing unit may also include a second shift addition circuit, which is configured to obtain the exponent after the multiplication computation according to the exponent result obtained after each calling of the exponent processing unit.

Further, the second shift addition circuit includes a second shifter, a second intermediate memory and a second adder. When the second control circuit calls the exponent processing unit multiple times, after the first calling, the second shifter shifts the exponent result obtained in the first calling and stores the shifted exponent result into the second intermediate memory. From the second calling of the exponent processing unit, the second shifter shifts the exponent result obtained in the second calling. The second adder adds the shifted exponent result to the result stored in the second intermediate memory, and then stores the addition result in the second intermediate memory to update the second intermediate memory, and the value stored in the second intermediate memory in the last calling is set as the exponent after the multiplication computation.

When calling the exponent processing unit every time, the second shifter shifts the exponent result obtained in a current calling according to the following method: if the addend and the augend are intercepted from the high bit to the low bit when calling the exponent processing unit, the parts intercepted from the addend and the augend may be shifted to the left, and the number of shifted bits is bits of a part after the part that is intercepted from the augend in the calling.

For example, with reference to the above examples, the bit width of the addend is 6 bits, and the bit width of the augend is 9 bits; the largest addend bit width and the largest augend bit width supported by the exponent processing unit are 8 bits; from the high bit to the low bit, the parts of 7 bit widths are intercepted from the addend and the augend at the same time in each calling. Further, after calling the exponent processing unit for the first time, the second shifter may shift the exponent result obtained in the first calling to the left by 2 bits (because there is 2-bit data after the part intercepted from the augend in this calling) and store the shifted exponent result in the second intermediate memory. From the second calling of the exponent processing unit, the second shifter shifts the exponent result obtained in this calling to the left. Because there is no data after the intercepted part in this calling, the result may be shifted by 0 bit to the left (no shift). The second adder adds the exponent result that is shifted by 0 bit to the value stored in the second intermediate memory, and then stores the addition result into the second intermediate memory to update the second intermediate memory. Because the second calling is the last calling, the value stored in the second intermediate memory after the second calling is the exponent after the multiplication computation.

It should be known according to the case that has been described specifically about the plurality of callings of the multiplier (the mantissa processing unit and the exponent processing unit) of the present disclosure that the control unit may include a plurality of subunits, which may be respectively configured to perform such various operations in the plurality of callings such as determining a plurality of callings of the mantissa processing unit, determining the number of times of callings, determining the data input into the mantissa processing unit in each calling, determining whether the bit width of the mantissa and the bit width supported by the mantissa processing unit may match each other, and adjusting the input of the mantissa. The second control unit may also include the plurality of subunits. Similarly, these subunits may respectively perform various operations in the plurality of callings.

By referring to FIG. 4 to FIG. 6, the above description describes operations performed by the multiplier of the present disclosure to the mantissas of the first floating-point number and the second point number when performing floating-point computation. Certainly, to focus on describing operations of the mantissa processing unit of the present disclosure, FIG. 4 does not include or describe other units like the exponent processing unit and the sign processing unit. By referring to FIG. 7, the following may describe the multiplier of the present disclosure in general, and the above description about the mantissa processing unit may also apply to what is described in FIG. 7.

Figure 7:
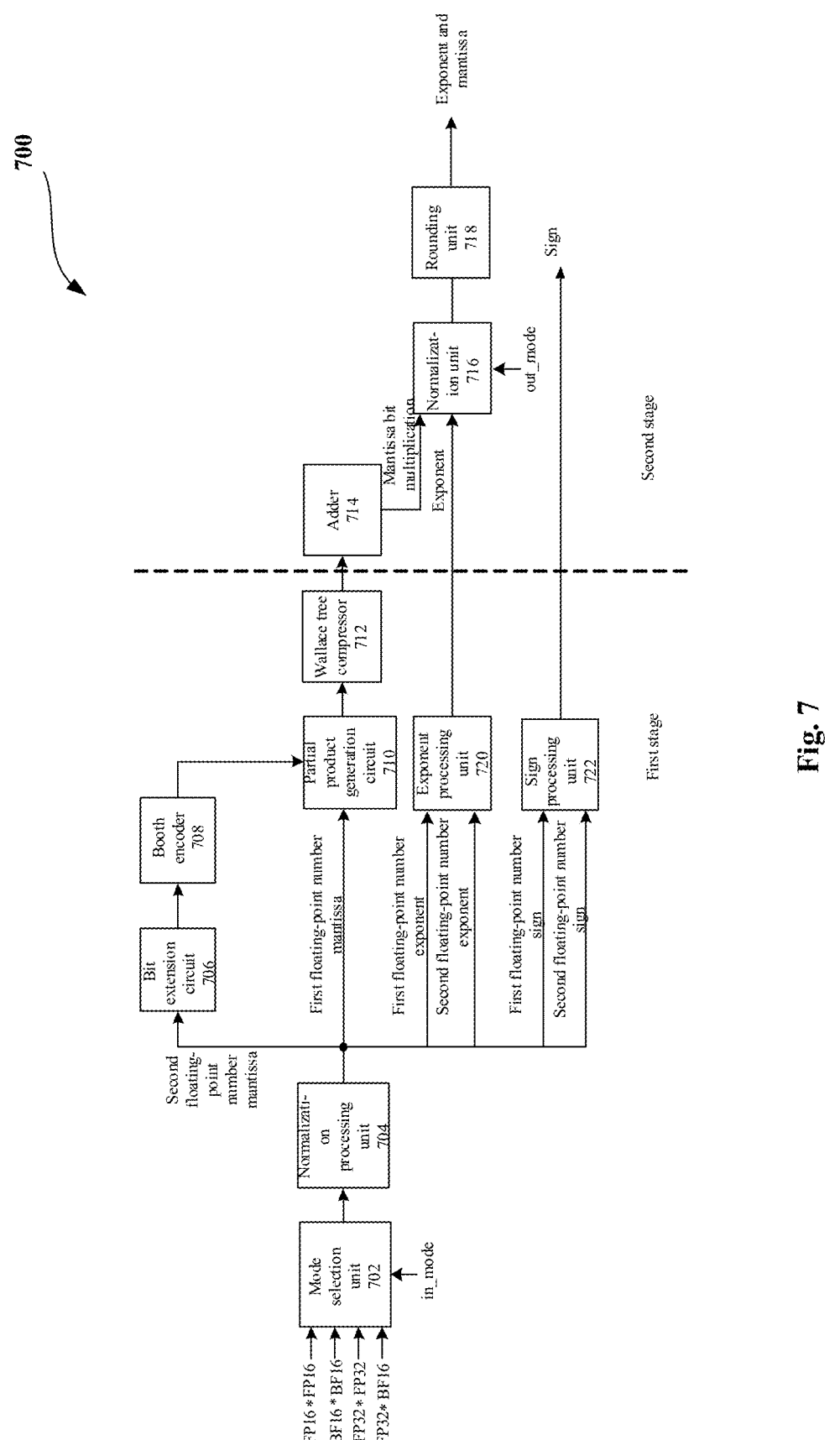
FIG. 7 is an entire schematic diagram of the multiplier, according to an embodiment of the present disclosure.

FIG. 7 is an entire schematic block diagram of the multiplier 700, according to an embodiment of the present disclosure. It should be understood that positions, existences and connection relationships of all types of units drawn in the figure are only exemplary but not restrictive. For example, some of the units may be integrated, and some other units may be separated or be omitted or be replaced according to different application scenarios.

Operations of the multiplier of the present disclosure in every computation mode may be exemplarily divided into a first stage and a second stage according to an operation process, as drawn by dotted lines in the figure. Generally speaking, the first stage includes outputting the computation result of the sign bit, the intermediate computation result of the exponent bit, the intermediate computation result of the mantissa bit (for example, including the encoding process of a fixed-point multiplication Booth encoding for inputting the mantissa bit and the compression process of the Wallace tree). The second stage includes normalizing and rounding the exponent and the mantissa to output the computation result of the exponent and to output the computation result of the mantissa.

As shown in FIG. 7, the multiplier of the present disclosure may include a mode selection unit 702 and a normalization processing unit 704, where the mode selection unit may choose the computation mode according to an input mode signal (in_mode). In an embodiment, the input mode signal may correspond to the computation mode number in Table 2. For example, when the input mode signal indicates computation mode number "1" in Table 2, the multiplier may work under the FP16*FP16 computation mode, and when the input mode signal indicates computation mode number "3" in Table 2, the multiplier may work under the FP32*FP32 computation mode. For the purpose of illustration, FIG. 7 only shows four types of exemplary computation modes: FP16*FP16, BF16*BF16, FP32*FP32 and FP32*BP16. However, just as mentioned before, the multiplier of the present disclosure also supports other various types of computation modes.

The normalization processing unit may be configured to normalize the first floating-point number or the second floating-point number according to the computation mode when the first floating-point number or the second floating-point number is a non-normalized and non-zero floating-point number to obtain the corresponding exponent and mantissa, such as normalizing the floating-point number of the data format indicated by the computation mode according to the IEEE754 standard.

Further, the multiplier includes the mantissa processing unit configured to perform the multiplication of the mantissa of the first floating-point number and the mantissa of the second floating-point number. Therefore, in one or more embodiments, the mantissa processing unit may include a bit extension circuit 706, a Booth encoder 708, a partial product generation circuit 710, a Wallace tree compressor 712 and an adder 714, where the bit extension circuit may be configured to perform bit extension to a mantissa of at least one of the first floating-point number and the second floating-point number, such as adding zeros to the high bit to make the number applicable to the operation of the Booth encoder. The control circuit may perform the above-mentioned operation of calling the mantissa processing unit multiple times to the mantissa obtained through extending the sign bit of the mantissa by the bit extension circuit. Descriptions of the Booth encoder, the partial product generation circuit, the Wallace tree compression and the adder have been made by referring to FIG. 4 to FIG. 6, so that same descriptions are applicable here and may not be repeated.

In some embodiments, the multiplier of the present disclosure may include a normalization unit 716 and a rounding unit 718. The normalization unit and the rounding unit have the same function as units shown in FIG. 3. Specifically, the normalization unit may perform floating-point number normalization processing to the exponent data from the exponent processing unit and the summation result according to the indicated data format by the output mode signal "out-_mode" shown in FIG. 7 to obtain the normalization exponent result and the normalization mantissa result. For example, the normalization unit may adjust the bit width of the exponent and the bit width of the mantissa according to the data format indicated by the output mode signal to make the exponent and the mantissa meet the requirement of the above-mentioned indicated data format. For another example, when the highest bit of the mantissa is 0, and the mantissa is not 0, the normalization unit may repeat the operation of shifting the mantissa by 1 bit to the left and subtracting 1 from the exponent until the value of the highest bit equals 1. For the rounding unit, in an embodiment, the rounding unit may be configured to perform a rounding operation to the normalized mantissa result according to a rounding mode to obtain the mantissa after the rounding operation, and set the mantissa after the rounding operation as the mantissa after the multiplication computation.

In one or more embodiments, the above-mentioned output mode signal may be a part of the computation mode and be configured to indicate the data format after the multiplication computation. For example, as described in Table 3, when the computation mode number is "12", number "1" equals to the above-mentioned "in_mode" signal and is configured to indicate execution of the FP16*FP16 multiplication operation, and number "2" equals to "out_mode" signal and is configured to indicate that the data type of the output result is BF16. It should be understood that in some application scenarios, the output mode signal may be combined with the above-mentioned input mode signal, so as to be provided to the mode selection unit. Based on this combined mode signal, the mode selection unit may define the data format of the input data and the data format of the output result at the beginning of the multiplication but does not need to provide an output mode signal to the normalization only, which may further simplify the operation.

In one or more embodiments, the above-mentioned rounding operation may exemplarily include the following five types of rounding modes.

(1) Rounding to the nearest value: under this mode, when two values are equally near, an even number may be taken first. At this time, the result may be rounded to the nearest value that may be representable. When there are two equally near values, the even number may be taken as the rounding result (a 0-terminated number in binary);

(2) Rounding up and rounding down: exemplary operations may be referred to in the following examples;

(3) Rounding to a too direction: under this regulation, the result may be rounded to a positive infinity;

(4) Rounding to a-o direction: under this regulation, the result may be rounded to a negative infinity; and (5) Rounding to a 0 direction: under this regulation, the result may be rounded to 0.

A mantissa rounding example under the rounding mode: 24-bit mantissas of two normalized floating-point numbers are multiplied to obtain a 48 (47-0) bits mantissa, and after normalization (if the highest bit of the mantissa is 0, the mantissa may be shifted by 1 bit to the left; and if the highest bit of the mantissa is 1, the mantissa may not be shifted and one may be added to the above temporary exponent obtained earlier), this mantissa may only be taken from the 46th bit to the 24th bit. When the 23rd bit of the mantissa is 0, the (23-0) bit may by rounded down; and when the 23rd bit of the mantissa is 1, 1 may be carried to the 24th bit and the (23-0) bit may be rounded down.

Returning to FIG. 7, the multiplier of the present disclosure also includes an exponent processing unit 720 and a sign processing unit 722, where the exponent processing unit may be configured to obtain the exponent after the multiplication computation according to the computation mode, the exponent of the first floating-point number and the exponent of the second floating-point number. For example, the exponent processing circuit may add data of the exponent bit of the first floating-point number to corresponding offsets of the input floating-point data type, and add data of the exponent bit of the second floating-point number to corresponding offsets of the input floating-point data type, and then respectively subtract the offsets of corresponding output floating-point data type to obtain data of the exponent bit of the multiplication of the first floating-point number and the second floating-point number. In one or more embodiments, the exponent processing unit may be implemented as or include an adder and subtracter circuit, and the exponent processing unit is configured to obtain an exponent after the multiplication computation according to the exponent of the first floating-point number, the exponent of the second floating-point number and the computation mode.

The sign processing unit may be implemented as an exclusive-OR circuit in an embodiment, and the sign processing unit is configured to perform an exclusive OR operation to the sign bit of the first floating-point number and the sign bit of the second floating-point number to obtain data of the sign bit of the multiplication of the first floating-point number and the second floating-point number.

The multiplier of the present disclosure is described in detail above by referring to FIG. 7. Through this description, those of ordinary skill in the art may understand that the disclosure of the present disclosure supports operations under a plurality of computation modes, thereby overcoming the defect that multiplier of the prior art only supports single floating-point type computation. Further, the multiplier of the present multiplier may be reused, so that floating-point type data with high bit width may be supported, which reduces computation costs and overheads. In one or more embodiments, the multiplier of the present disclosure may be arranged or included in an integrated circuit chip or the computation apparatus to perform multiplication computation to the floating-point number under a plurality of computation modes.

Figure 8:
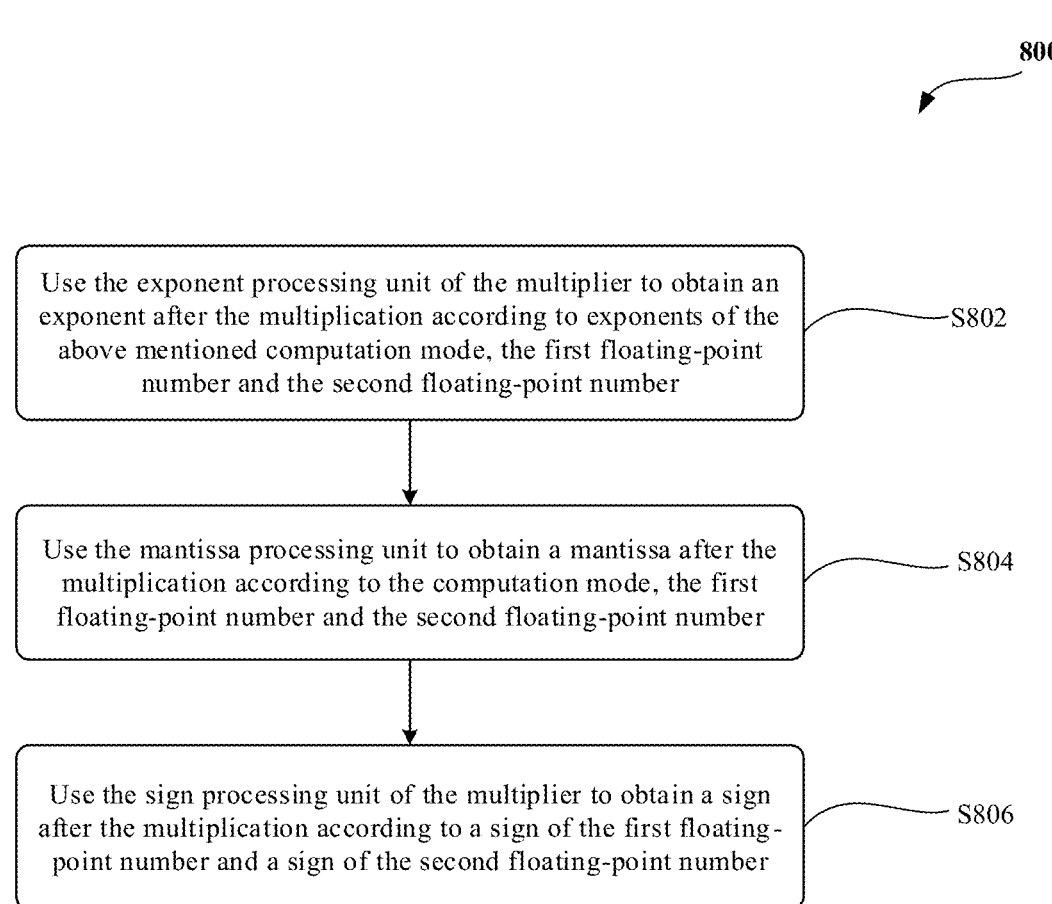
FIG. 8 is a flowchart of a method of performing floating-point number multiplication computation by using the multiplier, according to an embodiment of the present disclosure.

FIG. 8 is a flowchart of a method 800 of performing a floating-point number multiplication by using a multiplier, according to an embodiment of the present disclosure. It may be understood that the multiplier described here is the multiplier described above in detail by referring to FIG. 1 to FIG. 7, so that the above descriptions about the internal composition, function and operation of the multiplier are also applicable here.

As shown in FIG. 8, the method 800 may also include the obtained exponent after the multiplication computation according to the computation mode, the exponent of the first floating-point number and the exponent of the second floating-point number at the step S802 through using the exponent processing unit of the multiplier. As mentioned before, the computation mode may be one of the plurality of computation modes, and the computation mode may be configured to indicate the data format of the floating-point number. In one or more embodiments, the computation mode may also be configured to define the data format of the floating-point number of the output result.

Further, at the step S804, the method 800 may use the mantissa processing unit of the multiplier to obtain a mantissa after the multiplication computation according to the computation mode, the first floating-point number and the second floating-point number. For exemplary operations about the mantissa, the present disclosure uses the Booth encoding algorithm and the Wallace tree compressor in some preferred embodiments, thereby improving efficiency of mantissa processing. In addition, when the first floating-point number and the second floating-point number are signed numbers, the method 800 may also be configured to obtain the sign after the multiplication computation according to the sign of the first floating-point number and the sign of the second floating-point number in the step S806.

Even though the above mentioned methods show using the multiplier of the present disclosure to perform multiplication computation of the floating-point number in the form of steps, the order of the steps does not mean steps of the method must be performed according to the described order, but may be performed in other orders or in a parallel way. In addition, for the purpose of simple description, other steps of the method 800 are not described here, but those of ordinary skill in the art may understand that the method may perform the various above descriptions with reference to FIG. 1 to FIG. 7 through using the multiplier.

In the above-mentioned embodiments of the present disclosure, the descriptions of each embodiment has their own emphasis. For a part that is not described in detail in one embodiment, related descriptions in other embodiments may be referred to. Each technical features of the embodiments above may be randomly combined. For simple description, not all possible combinations of the technical features of the embodiments above are described. Yet, provided that there is no contradiction, combinations of these technical features fall within the scope of the description of the present specification.

Figure 9:
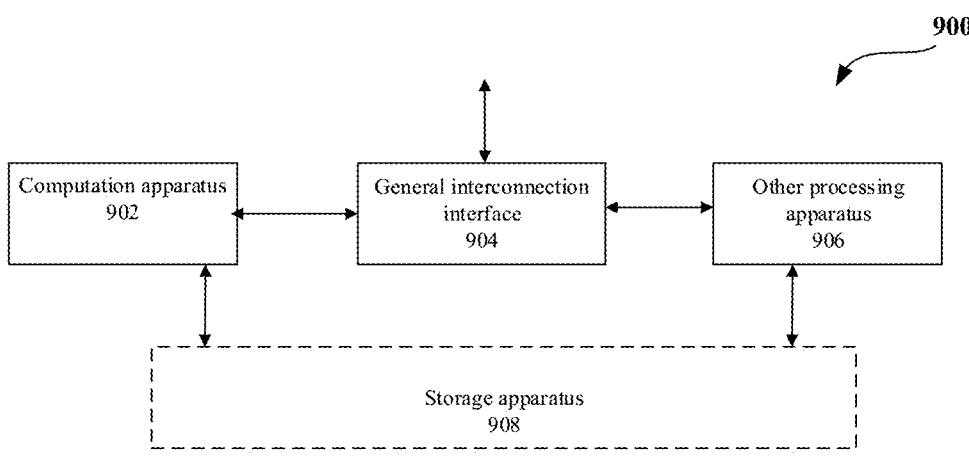
FIG. 9 is a structural diagram of a combined processing apparatus, according to an embodiment of the present disclosure.

FIG. 9 is a structural diagram of a combined processing apparatus 900, according to an embodiment of the present disclosure. As shown in FIG. 9, the combined processing apparatus 900 includes a computation apparatus 902, which may include the above multiplier of the present disclosure described with reference to the drawings. In addition, the combined processing unit may also include a general interconnection interface and other processing apparatus 906. The computation apparatus interacts with other processing apparatus to jointly complete operations specified by the user.

According to the solutions of the present disclosure, other processing apparatus may include at least one or more of a general-purpose/special-purpose processors such as a central processing unit (CPU), a graphics processing unit (GPU), a neural network processor, and the like, and the number is not restrictive but needs to be determined according to actual needs. In one or more embodiments, other processing apparatus may serve as an interface that connects the computation apparatus of the present disclosure to external data and control to perform basic control, including but not limited to data moving, starting and stopping the machine learning computation apparatus; and other processing apparatus may also cooperate with a machine learning computation apparatus to complete computation tasks.

According to the solutions of the present disclosure, the general interconnection interface may also be configured to transmit data and control instructions between the computation apparatus and other processing apparatus. For example, the computation apparatus may obtain required input data from other processing apparatus through the general interconnection interface, and write the required input data to a storage apparatus of the computation apparatus. Further, the computation apparatus may obtain a control instruction from other processing apparatus through the general interconnection interface, and write the control instruction to a control caching unit of the computation apparatus. Alternatively, the general interconnection interface may read data in the storage unit of the computation apparatus and transmit the data to other processing apparatus.

The combined processing apparatus may also include a storage apparatus 908, which may be connected to the computation apparatus and other processing apparatus respectively. In one or more embodiments, the storage apparatus is configured to store data of the computation apparatus and other processing apparatus. And the storage apparatus is specifically applicable to the to-be-computed data that may not be entirely stored in the computation apparatus or internal storage of other processing apparatus.

According to different scenarios, the combined processing apparatus of the present disclosure may be used as an SOC (system on chip) of a mobile phone, a robot, a drone, a video capture device, a video surveillance device, and the like, which may effectively reduce a core area of a control part, and increase the processing speed, and reduce the overall power consumption. In this case, the general interconnection interface of the combined processing apparatus may be connected to some components of the device. The components may include a camera, a monitor, a mouse, a keyboard, a network card, or a WIFI interface.

In some embodiments, the present disclosure also provides a chip or an integrated circuit chip, including the above-mentioned computation apparatus, the combined processing apparatus and the multiplier of the present disclosure. In other embodiments, the present disclosure also provides a chip package structure, which includes the above-mentioned chip.

Figure 10:
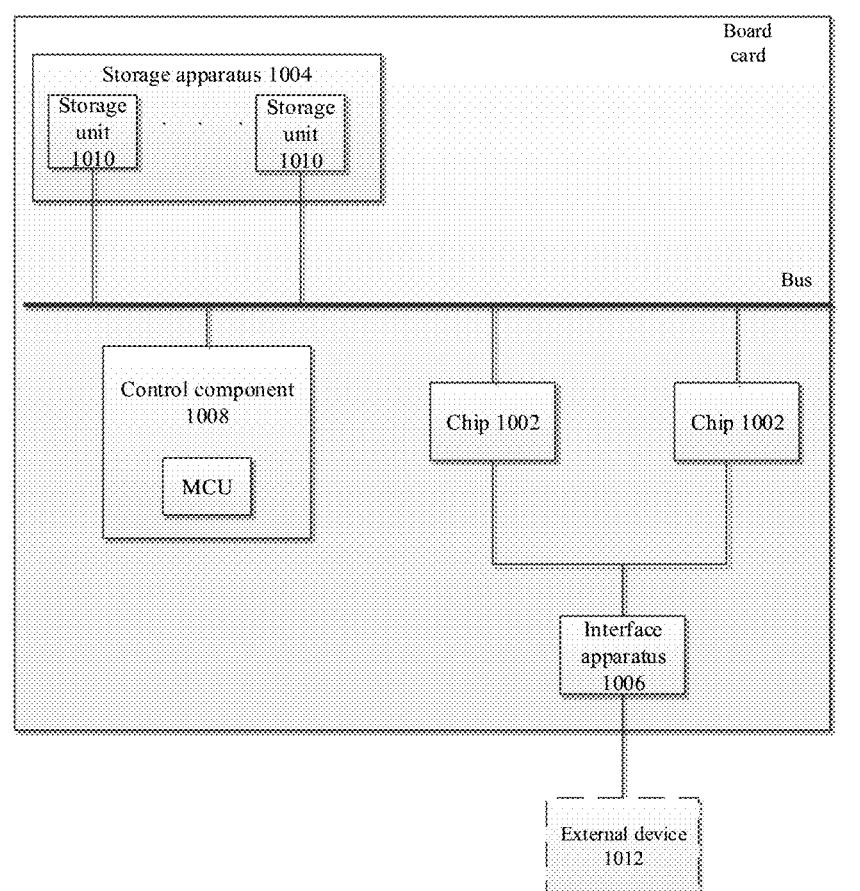
FIG. 10 is a structural diagram of a board card, according to an embodiment of the present disclosure.

In some embodiments, the present disclosure also provides a board card, which includes the above chip package structure. FIG. 10 shows the above-mentioned exemplary board card, which not only includes the above-mentioned chip 1002, but also includes other supporting components, which include but are not limited to: a storage component 1004, an interface apparatus 1006, and a control component 1008.

The storage component is connected to the chip in the chip package structure through a bus, and the storage apparatus is for data storing. The storage component may include a plurality of groups of storage units 1010. Each group of storage units is connected to the chip through the bus. It may be understood that each group of storage units may be a DDR SDRAM (a double data rate synchronous random access memory).

A DDR does not need to increase a clock frequency to double a speed of a SDRAM. The DDR allows data to be read on the rising and falling edges of the clock pulse. The speed of DDR is twice that of a standard SDRAM. In an embodiment, the storage component may include 4 groups of storage units. Each group of storage units may include a plurality of DDR4 particles (chips). In an embodiment, four 72-bit DDR4 controllers may be included in the chip, where 64 bits of 72 bits of each DDR4 controller are for data transmission and 8 bits are for an ECC (error checking and correcting) parity.

In an embodiment, each group of the storage units includes a plurality of DDR SDRAMs arranged in parallel. The DDR may transmit data twice per clock cycle. A DDR controller may be arranged inside the chip to control the data transmission and data storage of each storage unit.

The interface apparatus is electrically connected to the chip in the chip package structure. The interface apparatus is configured to implement data transmission between the chip and an external device 1012 (such as a server or a computer). For example, in an embodiment, the interface apparatus may be a standard PCIe (peripheral component interconnect express) interface. For example, data to be processed is transmitted from the server to the chip through a standard PCIe interface to realize data transmission. In another embodiment, the interface apparatus may also be other interfaces. The present disclosure does not restrict a specific form of other interfaces as long as the interface unit may realize a transmitting function. In addition, a computation result of the chip is still sent back to the external device (such as a server) by the interface apparatus.

The control component is connected to the chip to monitor a status of the chip. Specifically, the chip and the control component may be electrically connected through an SPI (serial peripheral interface). The control component may include an MCU (micro controller unit). For example, the chip may include a plurality of processing chips, processing cores, or processing circuits, and may drive a plurality of loads. Therefore, the chip may be in different working states such as a multi-load state and a light-load state. The control apparatus may realize regulation of working states of a plurality of processing chips, processing cores and/or processing circuits in the chip.

In some embodiments, the present disclosure provides an electronic device or apparatus, which includes the above-mentioned board card. According to different application scenarios, the electronic device or apparatus may include a data processing apparatus, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle includes an airplane, a ship, and/or a car; the household appliance may include a television, an air conditioner, a microwave oven, a refrigerator, an electric rice cooker, a humidifier, a washing machine, an electric lamp, a gas cooker, and a range hood; and the medical device may include a nuclear magnetic resonance spectrometer, a B-ultrasonic scanner, and/or an electrocardiograph.

It should be noted that the above-mentioned embodiments, for the sake of conciseness, are all described as a series of action combinations, but those skilled in the art should know that the present disclosure is not limited by the described order of action since some steps may be performed in a different order or simultaneously according to the present disclosure. Secondly, those skilled in the art should also understand that the embodiments described in the specification are all optional, and the actions and units involved are not necessarily required for this disclosure.

In the above-mentioned embodiments, description of each embodiment has its own emphasis. For parts that are not described in detail in an embodiment, reference may be made to related descriptions of other embodiments.

In some embodiments of the present disclosure, it should be understood that the apparatus of the present disclosure may be implemented in other manners. The embodiments described above are merely illustrative, for example, the division of the unit is only a division of a logical function. In a real implementation, there may be other manners for division. For example, a plurality of units or components may be combined or may be integrated into another system, or some features may be ignored or not performed. In addition, coupling or direct coupling or communication connection between each illustrated or discussed component may be indirect coupling or communication connection through some interfaces, apparatus or units, and may be in the form of electrical, optical, acoustic, magnetic, and the like.

The units described as separate components may or may not be physically separated. The components shown as units may or may not be physical units. In other words, the components may be located in one place, or may be distributed to a plurality of network units. According to certain needs, some or all of the units may be selected for realizing the purposes of the embodiments of the present disclosure.

In addition, functional units in every embodiment of the present disclosure may be integrated into one processing unit, or each unit may be physically stand alone, or two or more units may be integrated into one unit. The integrated units above may be implemented in the form of hardware or in the form of software program unit.

When the integrated units are implemented in the form of a software program module and sold or used as an independent product, the integrated units may be stored in a computer-readable memory. Based on such understanding, the technical solutions of the present disclosure may be embodied in the form of a software product that is stored in a memory. The software product includes several instructions to enable a computer equipment (which may be a personal computer, a server, or a network device, and the like) to perform all or part of the steps of the method described in the embodiments of the present disclosure. The above-mentioned memory includes: a USB flash drive, a read-only memory (ROM), a random access memory (RAM), a mobile hard disk, a magnetic disk, or an optical disc, and other media that may store program codes.

The foregoing contents may be better understood according to the following articles:

Article A1. A multiplier configured to perform a multiplication computation of a floating-point number, wherein the multiplier includes: a mantissa processing unit configured to obtain a mantissa after the multiplication computation according to a mantissa of the floating-point number, wherein the mantissa processing unit includes a control circuit, which is configured to call the mantissa processing unit multiple times when a mantissa bit width of at least one of two floating-point numbers is larger than a data bit width that is processable at one time by the mantissa processing unit.

Article A2. The multiplier of article A1, wherein the two floating-point numbers include a first floating-point number and a second floating-point number, and the mantissa processing unit supports a first bit width and a second bit width, wherein a mantissa of the first floating-point number is set as a first input corresponding to the first bit width, a mantissa of the second floating-point number is set as a second input corresponding to the second bit width, a bit width of the first input is less than or equal to the first bit width, and the control circuit is configured to call the mantissa processing unit multiple times to obtain the mantissa after the multiplication computation when a bit width of the second input is larger than the second bit width.

Article A3. The multiplier of article A1 or A2, wherein the two floating-point numbers include a first floating-point number and a second floating-point number; the mantissa processing unit supports a first bit width and a second bit width, wherein a mantissa of the first floating-point number is set as a first input corresponding to the first bit width, and a mantissa of the second floating-point number is set as a second input corresponding to the second bit width; and the control circuit is configured to call the mantissa processing unit multiple times to obtain the mantissa after the multiplication computation when a bit width of the first input is larger than the first bit width and a bit width of the second input is less than or equal to the second bit width, and when the bit width of the second input is larger than the second bit width and the bit width of the first input is less than or equal to the first bit width or when the bit width of the first input is larger than the first bit width and the bit width of the second input is larger than the second bit width.

Article A4. The multiplier of any one of articles A1 to A3, wherein when a mantissa bit width of the first floating-point number is less than a mantissa bit width of the second floating-point number and the first bit width is larger than the second bit width, or when the mantissa bit width of the first floating-point number is larger than the mantissa bit width of the second floating-point number and the first bit width is less than the second bit width, the control circuit selects the mantissa of the first floating-point number as the second input corresponding to the second bit width and selects the mantissa of the second floating-point number as the first input corresponding to the first bit width.

Article A5. The multiplier of any one of articles A1 to A4, wherein when the bit width of the first input is larger than the first bit width and the bit width of the second input is less than or equal to the second bit width, the control circuit determines the number of times of calling the mantissa processing unit and data that is input into the mantissa processing unit in each calling according to the bit width of the first input and the first bit width.

Article A6. The multiplier of any one of articles A1 to A5, wherein when the bit width of the second input is larger than the second bit width and the bit width of the first input is less than or equal to the first bit width, the control circuit determines the number of times of calling the mantissa processing unit and the data that is input into the mantissa processing unit in each calling according to the bit width of the second input and the second bit width.

Article A7. The multiplier of any one of articles A1 to A6, wherein when the bit width of the first input is larger than the first bit width and the bit width of the second input is larger than the second bit width, the control circuit determines the number of times of callings the mantissa processing unit and data that is input into the mantissa processing unit in each calling according to the bit width of the first input, the first bit width, the bit width of the second input, and the second bit width.

Article A8. The multiplier of any one of articles A1 to A7, wherein the mantissa processing unit also includes a shift addition circuit, which is configured to obtain the mantissa after the multiplication computation according to mantissa result obtained during each calling of the mantissa processing unit.

Article A9. The multiplier of any one of articles A1 to A8, wherein the shift addition circuit includes a shifter, an intermediate memory and an adder, wherein when the control circuit calls the mantissa processing unit multiple times, after a first calling, the shifter shifts a mantissa result obtained during the first calling to obtain a shifted mantissa result and stores the shifted mantissa result into the intermediate memory, and from a second calling, the shifter shifts a mantissa result obtained during a the current calling to obtain a current mantissa result; the adder adds the current mantissa result to a result stored in the intermediate memory, and then stores an addition result in the intermediate memory to update the intermediate memory; and a result stored in the intermediate memory after the last calling is set as the mantissa after the multiplication computation.

Article A10. The multiplier of any one of articles A1 to A9, wherein the multiplier also includes an exponent processing unit, which is configured to obtain an exponent after the multiplication computation according to exponents of the two floating-point numbers, wherein the exponent processing unit includes a second control circuit, which is configured to determine calling the exponent processing unit multiple times to obtain the exponent after the multiplication computation according to an exponent bit width of one of the two floating-point numbers and one of two bit widths supported by the exponent processing unit or according to exponent bit widths of the two floating-point numbers and the two bit widths supported by the exponent processing unit.

Article A11. The multiplier of any one of articles A1 to A10, wherein the two floating-point numbers include a first floating-point number and a second floating-point number; the exponent processing unit supports a third bit width and a fourth bit width, wherein an exponent of the first floating-point number is set as a third input corresponding to the third bit width, and an exponent of the second floating-point number is set as a fourth input corresponding to the fourth bit width; and a bit width of the third input is less than or equal to the third bit width, and the second control circuit is configured to call the exponent processing unit multiple times to obtain the exponent after the multiplication computation when a bit width of the fourth input is larger than the fourth bit width.

Article A12. The multiplier of any one of articles A1 to A11, wherein the two floating-point numbers include a first floating-point number and a second floating-point number, the exponent processing unit supports a third bit width and a fourth bit width, wherein an exponent of the first floating-point number is set as a third input corresponding to the third bit width, and an exponent of the second floating-point number is set as a fourth input corresponding to the fourth bit width; and the second control circuit is configured to call the exponent processing unit multiple times to obtain the exponent after the multiplication computation when a bit width of the third input is larger than the third bit width and a bit width of the fourth input is less than or equal to the fourth bit width, and when the bit width of the fourth input is larger than the fourth bit width and the bit width of the third input is less than or equal to the third bit width or when the bit width of the third input is larger than the third bit width and the bit width of the fourth input is larger than the fourth bit width.

Article A13. The multiplier of any one of articles A1 to A12, wherein when an exponent bit width of the first floating-point number is less than an exponent bit width of the second floating-point number and the third bit width is larger than the fourth bit width, or when the exponent bit width of the first floating-point number is larger than the exponent bit width of the second floating-point number and the third bit width is less than the fourth bit width, the second control circuit selects the exponent of the first floating-point number as the fourth input corresponding to the fourth bit width, and selects the exponent of the second floating-point number as the third input corresponding to the third bit width.

Article A14. The multiplier of any one of articles A1 to A13, wherein the second control circuit is configured to determine the number of times of calling the exponent processing unit and data that is input into the exponent processing unit in each calling according to the bit width of the fourth input and the third bit width when the bit width of the third input is less than or equal to the bit width of the fourth input and the third bit width is less than or equal to the fourth bit width.

Article A15. The multiplier of any one of articles A1 to A14, wherein the exponent processing unit also includes a second shift addition circuit, which is configured to obtain the exponent after the multiplication computation according to an exponent result obtained during each calling of the exponent processing unit.

Article A16. The multiplier of any one of articles A1 to A15, wherein the mantissa processing unit includes a partial product computation unit and a partial product summation unit, wherein the partial product computation unit is configured to obtain an intermediate result according to mantissas of the two floating-point numbers, and the partial product summation unit is configured to perform a summation computation on intermediate results to obtain a summation result and take the summation result as the mantissa after the multiplication computation.

Article A17. The multiplier of any one of articles A1 to A16, wherein the partial product computation unit includes a Booth encoding circuit, which is configured to perform Booth encoding processing on the mantissa of the first floating-point number or the mantissa of the second floating-point number to obtain the intermediate result.

Article A18. The multiplier of any one of articles A1 to A17, wherein the partial product summation unit includes an adder, which is configured to sum the intermediate results to obtain the summation result.

Article A19. The multiplier of any one of articles A1 to A18, wherein the partial product summation unit includes a Wallace tree and an adder, wherein the Wallace tree is configured to sum the intermediate results to obtain a second intermediate result, and the adder is configured to sum the second intermediate result to obtain the summation result.

Article A20. The multiplier of any one of articles A1 to A19, wherein the adder includes at least one of adders including a full adder, a serial adder and a carry lookahead adder.

Article A21. The multiplier of any one of articles A1 to A20, wherein when a count of the intermediate results is less than M, a zero value is added as the intermediate result to make the count of the intermediate results equal to M, wherein M is a presupposed positive integer.

Article A22. The multiplier of any one of articles A1 to A21, wherein each Wallace tree has M inputs and N outputs, and a count of Wallace trees is no less than K, wherein N is a presupposed positive integer that is less than M, and K is a positive integer that is no less than a largest bit width of the intermediate result.

Article A23. The multiplier of any one of articles A1 to A22, wherein the partial product summation unit is configured to select one group or a plurality of groups of Wallace trees to sum the intermediate results, wherein each group of Wallace trees has X Wallace trees, and X is a bit number of the intermediate result, wherein there is successive carry relationships among Wallace trees in one group, but there is no carry relationship between Wallace trees of different groups.

Article A24. The multiplier of any one of articles A1 to A23, wherein the multiplier further includes: a normalization processing unit configured to perform normalization processing on at least one of the two floating-point numbers to obtain a corresponding exponent and a corresponding mantissa when at least one of the two floating-point numbers is a non-normalized and non-zero floating-point number.

Article A25. The multiplier of any one of articles A1 to A24, wherein the multiplier is configured to perform a multiplication computation of the two floating-point numbers according to a computation mode, wherein the computation mode indicates data formats of the two floating-point numbers; the mantissa processing unit is configured to obtain the mantissa after the multiplication computation according to the computation mode and the mantissas of the two floating-point numbers, and the exponent processing unit is configured to obtain the exponent after the multiplication computation according to the computation mode and the exponents of the two floating-point numbers.

Article A26. The multiplier of any one of articles A1 to A25, wherein a normalization processing unit is further configured to perform normalization processing on at least one of the two floating-point numbers to obtain a corresponding exponent and a corresponding mantissa according to the computation mode.

Article A27. The multiplier of any one of articles A1 to A26, wherein a data format includes at least one of numbers including a half-precision floating-point number, a single precision floating-point number, a brain floating-point number, a double precision floating-point number and a self definition floating-point number.

Article A28. The multiplier of any one of articles A1 to A27, wherein the mantissa processing unit includes a bit number extending circuit, which is configured to extend a mantissa bit number of at least one of the first floating-point number and the second floating-point number.

Article A29. The multiplier of any one of articles A1 to A28, wherein the floating-point number further includes a sign, and the multiplier further includes: a sign processing unit configured to obtain a sign after the multiplication computation according to signs of the two floating-point numbers.

Article A30. The multiplier of any one of articles A1 to A29, wherein the sign processing unit includes an exclusive-OR logical circuit, which is configured to perform an exclusive-OR computation according to the signs of the two floating-point numbers to obtain the sign after the multiplication computation.

Article A31. The multiplier of any one of articles A1 to A30, further comprising a normalization unit configured to:

perform floating-point number normalization processing on the mantissa after the multiplication computation and the exponent after the multiplication computation to obtain a normalized exponent result and a normalized mantissa result, set the normalized exponent result as the exponent after the multiplication computation, and set the normalized mantissa result as the mantissa after the multiplication computation.

Article 32. The multiplier of any one of articles A1 to A31, further comprising: a rounding unit configured to perform a rounding operation to the normalized mantissa result according to a rounding mode to obtain a mantissa after a rounding, and take the mantissa after the rounding as the mantissa after the multiplication computation.

Article A33. A method for performing a floating-point number multiplication computation by using a multiplier, wherein a mantissa processing unit of the multiplier is used to obtain a mantissa after the multiplication computation according to a mantissa of a floating-point number, and the mantissa processing unit includes a control circuit, which is configured to call the mantissa processing unit multiple times when a mantissa bit width of at least one of two floating-point numbers is larger than a data bit width that is processable at one time by the mantissa processing unit.

Article A34. An integrated circuit chip, comprising the multiplier of any one of articles A1 to A31.

Article A35. A computation apparatus, comprising the multiplier of any one of articles A1 to A31 or the integrated circuit chip of article A34.

The embodiments of the present disclosure have been described in detail above. Specific examples have been used in the specification to explain the principles and implementation manners of the present disclosure. The descriptions of the above embodiments are only used to facilitate understanding of the methods and core ideas of the present disclosure.

Persons of ordinary skill in the art may change the implementation and application scope according to the ideas of the present disclosure. In summary, the content of this specification should not be construed as a limitation on the present disclosure.

It should be understood that terms such as "first", "second", "third", and "fourth" appear in the claims, the specification, and drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claim of the disclosure, unless the context clearly indicates otherwise, the singular forms "a", "an", and "the" are intended to include the plural forms. It should also be understood that the term "and/or" used in the specification and the claim refers to any and all possible combinations of one or more of relevant listed items and includes these combinations.

As being used in this specification and the claim, the term "if" may be interpreted as "when", or "once" or "in response to a determination" or "in response to a case where something is detected" depending on the context. Similarly, depending on the context, the clause "if it is determined that" or "if [a described condition or event] is detected" may be interpreted as "once it is determined that", or "in response to a determination", or "once [a described condition or event] is detected", or "in response to a case where [a described condition or event] is detected".

The embodiments of the present disclosure are described in detail above, and specific examples are used to illustrate principles and implementations of the present disclosure. The descriptions of the above embodiments are only used to help understand the methods and core ideas of the present disclosure. Persons of ordinary skill in the art may change or transform the implementation and application scope according to the ideas of the present disclosure. The changes and transformations shall all fall within the protection scope of the present disclosure. In summary, the content of this specification should not be construed as a limitation on the present disclosure.

What is claimed:

1. A multiplier configured to perform a multiplication computation of a floating-point number, wherein the multiplier includes:

a mantissa processing unit configured to obtain a mantissa after the multiplication computation according to a mantissa of the floating-point number, wherein the mantissa processing unit includes a control circuit, which is configured to call the mantissa processing unit multiple times when a mantissa bit width of at least one of two floating-point numbers is larger than a data bit width that is processable at one time by the mantissa processing unit, and wherein the two floating-point numbers include a first floating-point number and a second floating-point number, and the mantissa processing unit supports a first bit width and a second bit width, wherein a mantissa of the first floating-point number is set as a first input corresponding to the first bit width, a mantissa of the second floating-point number is set as a second input corresponding to the second bit width, a bit width of the first input is less than or equal to the first bit width, and the control circuit is configured to call the mantissa processing unit multiple times to obtain the mantissa after the multiplication computation when a bit width of the second input is larger than the second bit width.

2. The multiplier of claim 1, wherein the two floating-point numbers include a first floating-point number and a second floating-point number; the mantissa processing unit supports a first bit width and a second bit width, wherein a mantissa of the first floating-point number is set as a first input corresponding to the first bit width, and a mantissa of the second floating-point number is set as a second input corresponding to the second bit width; and the control circuit is configured to call the mantissa processing unit multiple times to obtain the mantissa after the multiplication computation when a bit width of the first input is larger than the first bit width and a bit width of the second input is less than or equal to the second bit width, and when the bit width of the second input is larger than the second bit width and the bit width of the first input is less than or equal to the first bit width, or when the bit width of the first input is larger than the first bit width and the bit width of the second input is larger than the second bit width.

3. The multiplier of claim 2, wherein when a mantissa bit width of the first floating-point number is less than a mantissa bit width of the second floating-point number and the first bit width is larger than the second bit width, or when the mantissa bit width of the first floating-point number is larger than the mantissa bit width of the second floating-point number and the first bit width is less than the second bit width, the control circuit selects the mantissa of the first floating-point number as the second input corresponding to the second bit width and selects the mantissa of the second floating-point number as the first input corresponding to the first bit width.

4. The multiplier of claim 3, wherein when the bit width of the first input is larger than the first bit width and the bit width of the second input is less than or equal to the second bit width, the control circuit determines the number of times of calling the mantissa processing unit and data that is input into the mantissa processing unit in each calling according to the bit width of the first input and the first bit width.

5. The multiplier of claim 3, wherein when the bit width of the second input is larger than the second bit width and the bit width of the first input is less than or equal to the first bit width, the control circuit determines the number of times of calling the mantissa processing unit and data that is input into the mantissa processing unit in each calling according to the bit width of the second input and the second bit width.

6. The multiplier of claim 3, wherein when the bit width of the first input is larger than the first bit width and the bit width of the second input is larger than the second bit width, the control circuit determines the number of times of calling the mantissa processing unit and data that is input into the mantissa processing unit in each calling according to the bit width of the first input, the first bit width, the bit width of the second input and the second bit width.

7. The multiplier of claim 1, wherein the mantissa processing unit also includes a shift addition circuit, which is configured to obtain the mantissa after the multiplication computation according to a mantissa result obtained during each calling of the mantissa processing unit.

8. The multiplier of claim 1, wherein the multiplier also includes an exponent processing unit, which is configured to obtain an exponent after the multiplication computation according to exponents of the two floating-point numbers, wherein the exponent processing unit includes a second control circuit, which is configured to determine calling the exponent processing unit multiple times to obtain the exponent after the multiplication computation according to an exponent bit width of one of the two floating-point numbers and one of two bit widths supported by the exponent processing unit, or according to exponent bit widths of the two floating-point numbers and the two bit widths supported by the exponent processing unit.

9. The multiplier of claim 8, wherein the two floating-point numbers include a first floating-point number and a second floating-point number; the exponent processing unit supports a third bit width and a fourth bit width, wherein an exponent of the first floating-point number is set as a third input corresponding to the third bit width, an exponent of the second floating-point number is set as a fourth input corresponding to the fourth bit width, and a bit width of the third input is less than or equal to the third bit width; and the second control circuit is configured to call the exponent processing unit multiple times to obtain the exponent after the multiplication computation when a bit width of the fourth input is larger than the fourth bit width.

10. The multiplier of claim 8, wherein the two floating-point numbers include a first floating-point number and a second floating-point number; the exponent processing unit supports a third bit width and a fourth bit width, wherein an exponent of the first floating-point number is set as a third input corresponding to the third bit width, and an exponent of the second floating-point number is set as a fourth input corresponding to the fourth bit width; and the second control circuit is configured to call the exponent processing unit multiple times to obtain the exponent after the multiplication computation when a bit width of the third input is larger than the third bit width and a bit width of the fourth input is less than or equal to the fourth bit width, and when the bit width of the fourth input is larger than the fourth bit width and the bit width of the third input is less than or equal to the third bit width or when the bit width of the third input is larger than the third bit width and the bit width of the fourth input is larger than the fourth bit width.

11. The multiplier of claim 1, wherein the mantissa processing unit includes a partial product computation unit and a partial product summation unit, wherein the partial product computation unit is configured to obtain an intermediate result according to mantissas of the two floating-point numbers, and the partial product summation unit is configured to perform a summation computation on intermediate results to obtain a summation result and take the summation result as the mantissa after the multiplication computation.

12. The multiplier of claim 11, wherein the partial product computation unit includes a Booth encoding circuit, which is configured to perform Booth encoding processing on the mantissa of the first floating-point number or the mantissa of the second floating-point number to obtain the intermediate result.

13. The multiplier of claim 8, wherein the multiplier further includes:

a normalization processing unit configured to perform normalization processing on at least one of the two floating-point numbers to obtain a corresponding exponent and a corresponding mantissa when at least one of the two floating-point numbers is a non-normalized and non-zero floating-point number.

14. The multiplier of claim 8, wherein the multiplier is configured to perform a multiplication computation of the two floating-point numbers according to a computation mode, wherein the computation mode indicates data formats of the two floating-point numbers; the mantissa processing unit is configured to obtain the mantissa after the multiplication computation according to the computation mode and the mantissas of the two floating-point numbers; and the exponent processing unit is configured to obtain the exponent after the multiplication computation according to the computation mode and the exponents of the two floating-point numbers.

15. The multiplier of claim 12, wherein the mantissa processing unit includes a bit number extending circuit, which is configured to extend a mantissa bit number of at least one of the first floating-point number and the second floating-point number.

16. The multiplier of claim 1, wherein the floating-point number further includes a sign, and the multiplier further includes:

a sign processing unit configured to obtain a sign after the multiplication computation according to signs of the two floating-point numbers.

17. The multiplier of claim 16, wherein the sign processing unit includes an exclusive-OR logical circuit, which is configured to perform an exclusive-OR computation according to the signs of the two floating-point numbers to obtain the sign after the multiplication computation.

18. A method for performing a floating-point number multiplication computation by using a multiplier, wherein a mantissa processing unit of the multiplier is used to obtain a mantissa after the multiplication computation according to a mantissa of a floating-point number, the mantissa processing unit includes a control circuit, which is configured to call the mantissa processing unit multiple times when a mantissa bit width of at least one of two floating-point numbers is larger than a data bit width that is processable at one time by the mantissa processing unit, and the two floating-point numbers include a first floating-point number and a second floating-point number, and the mantissa processing unit supports a first bit width and a second bit width, wherein a mantissa of the first floating-point number is set as a first input corresponding to the first bit width, a mantissa of the second floating-point number is set as a second input corresponding to the second bit width, a bit width of the first input is less than or equal to the first bit width, and the control circuit is configured to call the mantissa processing unit multiple times to obtain the mantissa after the multiplication computation when a bit width of the second input is larger than the second bit width.

\* \* \* \* \*